United States Patent [19]

Slone

[11] Patent Number: 5,007,284
[45] Date of Patent: Apr. 16, 1991

[54] PISTON RING AND LINER WEAR SIMULATOR AND METHOD OF USING SAME

[76] Inventor: Ralph J. Slone, 945 Driftwood Ave., Columbus, Ind. 47203

[21] Appl. No.: 485,571
[22] Filed: Feb. 27, 1990
[51] Int. Cl.$^5$ ............................................. G01M 19/00
[52] U.S. Cl. ............................................ 73/120; 73/9
[58] Field of Search ............... 73/120, 118.1, 7, 865.6, 73/9, 10

[56] References Cited

FOREIGN PATENT DOCUMENTS 772138  4/1957  Sweden ..................................... 73/7
877406 10/1981  U.S.S.R. ................................... 73/7

Primary Examiner—Jerry W. Myracle
Attorney, Agent, or Firm—Woodard, Emhardt, Naughton, Moriarty & McNett

[57] ABSTRACT

A new bench tester for laboratory simulation of piston ring and cylinder wear according to the invention includes tests made using liner segments which bear against a reciprocating piston ring. Temperatures up to 550° C. and loads and speeds representative of the most severe top ring conditions may be imposed. A precision oil spray system delivers the desired quantity and quality of oil to the wear interface. The computer controlled simulator duplicates the desired test cycle, and displays and stores data on friction forces and friction coefficients as the test proceeds. The invention provides a suitable simulator for production and prototype ring and liner combinations, including ceramic coatings for potential use in advanced diesel engines. The importance of the method of oil delivery on test repeatability is emphasized. Some comparisons with Cameron Plint bench tests and firing engine results are presented and good correlations were found with respect to the relative ranking of material pairs.

20 Claims, 22 Drawing Sheets

PISTON RING AND LINER WEAR SIMULATOR AND METHOD OF USING SAME

BACKGROUND OF THE INVENTION

The present invention relates in general to laboratory simulation devices which are used for testing materials and components in a laboratory environment in order to verify or predict how the materials and components will behave in actual use. More particularly, the present invention relates to a wear simulator for piston rings and cylinder liners wherein an operating engine environment is simulated and data on friction forces, wear and friction coefficients is developed based upon different speeds, loads, materials, temperatures and lubricants.

Future advanced diesel engines are expected to require lubricants, cylinders liners, and piston rings that can withstand higher temperatures under highly loaded conditions, with minimal lubrication at the sliding surfaces. Screening new materials and designs in an engine is very expensive and time consuming. To expedite screening, a high-temperature wear simulator has been developed. The wear simulator of the present invention is a bench type fixture capable of testing potential lubricant, liner and ring combinations under simulated engine conditions of speed, load, temperature and lubrication.

Earlier work in this area was orally presented at the 1987 Coatings for Advanced Heat Engines Workshop which was part of the U.S. Department of Energy Conference in Castine, Maine from July 27 to July 30, 1987.

One oral presentation by R. J. Slone et al. was entitled "Upper Cylinder Wear Simulation in Heavy Duty Diesel Engines." This presentation discussed the results of wear tests including testers which attempted to demonstrate the effects of lubrication, coatings, loadings and speeds. The present invention was not mentioned or discussed, and in fact the present invention was being developed and researched in order to overcome some of the deficiencies and drawbacks of the testers which were reviewed in this presentation.

Another oral presentation during this Department of Energy conference by M. G. Naylor was entitled "Development of Advanced Diesel Wear Coatings." This presentation discussed the characteristics of coatings used on the wear components of diesel engines. The specific wear testers used for the tests were not discussed.

While the earlier work of these two oral presentations identifies results, needs and concerns, it does not offer answers or solutions to certain deficiencies and drawbacks. The present invention provides these answers and solutions in an automated device which is used in a controlled environment and which uses actual components, piston rings, and portions of actual components, cylinder liners. The present invention is able to simulate the most stressful part (top and bottom piston ring reversal) of the piston ring cycle of a reciprocating engine. Other wear testers typically use special pieces made up for use in the tester and thereby lose some of its simulation value. The present invention provides a more reliable and more valid set of test results. The automated nature of the present invention enables the test to be initially set up with a wide range of settable conditions such as stroke, cycle rate, type of lubricant, temperature, etc. and then run automatically for the data gathering and processing phase. The wear simulator of the present invention has successfully demonstrated piston ring and cylinder liner wear rates which closely correlate to actual engine data.

SUMMARY OF THE INVENTION

A wear simulator for piston rings and cylinder liners according to a typical embodiment of the present invention includes a piston ring holder having means for receiving a piston ring, a cylinder liner holder having means for receiving a portion of a cylinder liner, positioning means connected to the cylinder liner holder for placing any cylinder liner portion received therein in contact with any piston ring received by the piston ring holder, reciprocating means connected to the piston ring holder for imparting a reciprocating stroke to any piston ring received therein and force measuring means cooperatively arranged with the cylinder liner holder for providing a signal corresponding to the level of frictional force between any piston ring received by the piston ring holder and any cylinder liner portion received by the cylinder liner holder.

One object of the present invention is to provide an improved wear simulator for piston rings and cylinder liners.

Related objects and advantages of the present invention will be apparent from the following description.

DESCRIPTION OF THE PREFERRED EMBODIMENT

Figure 1:
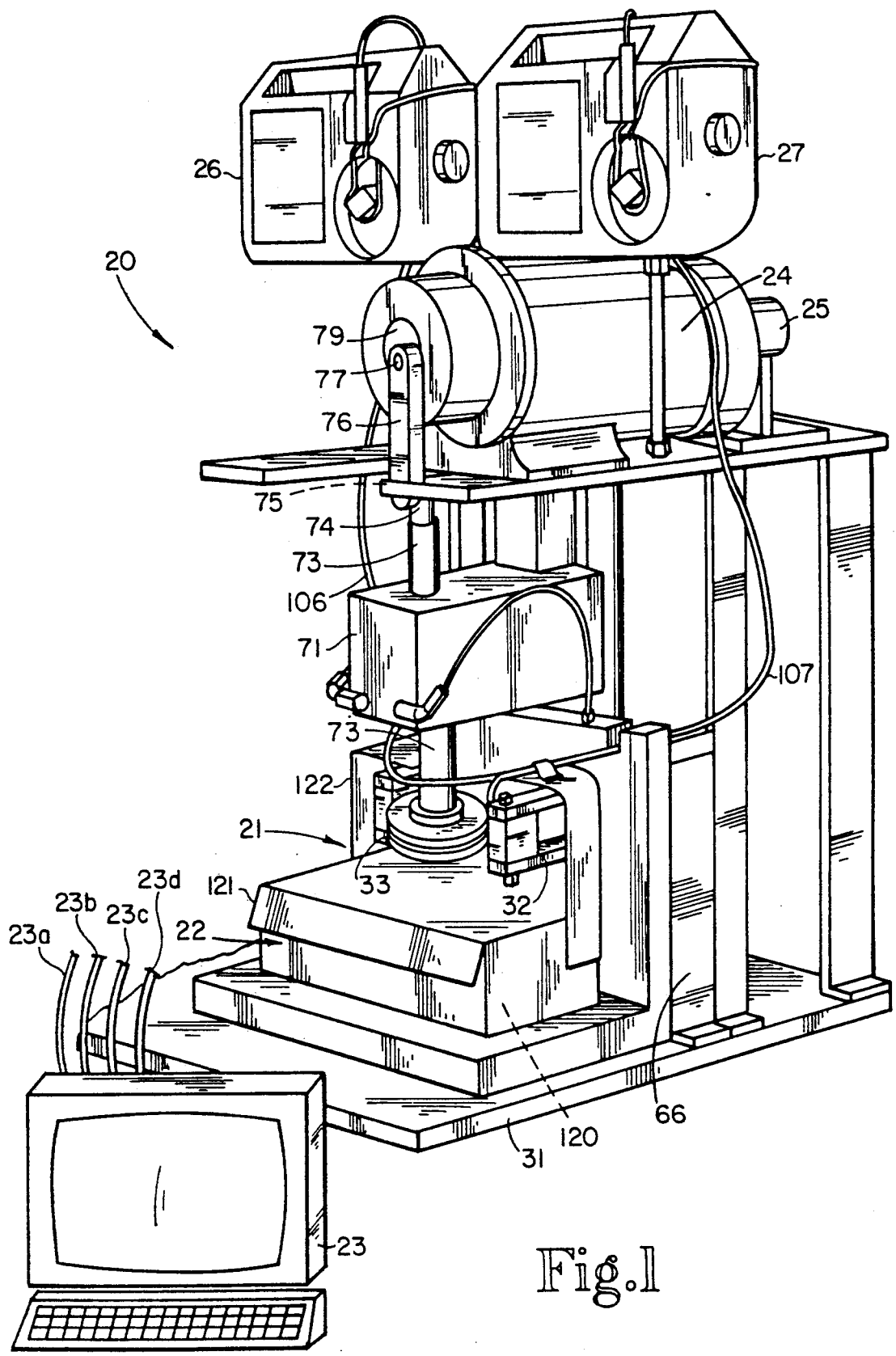
FIG. 1 is a diagrammatic illustration of a wear simulator according to a typical embodiment of the present invention.
Figure 2:
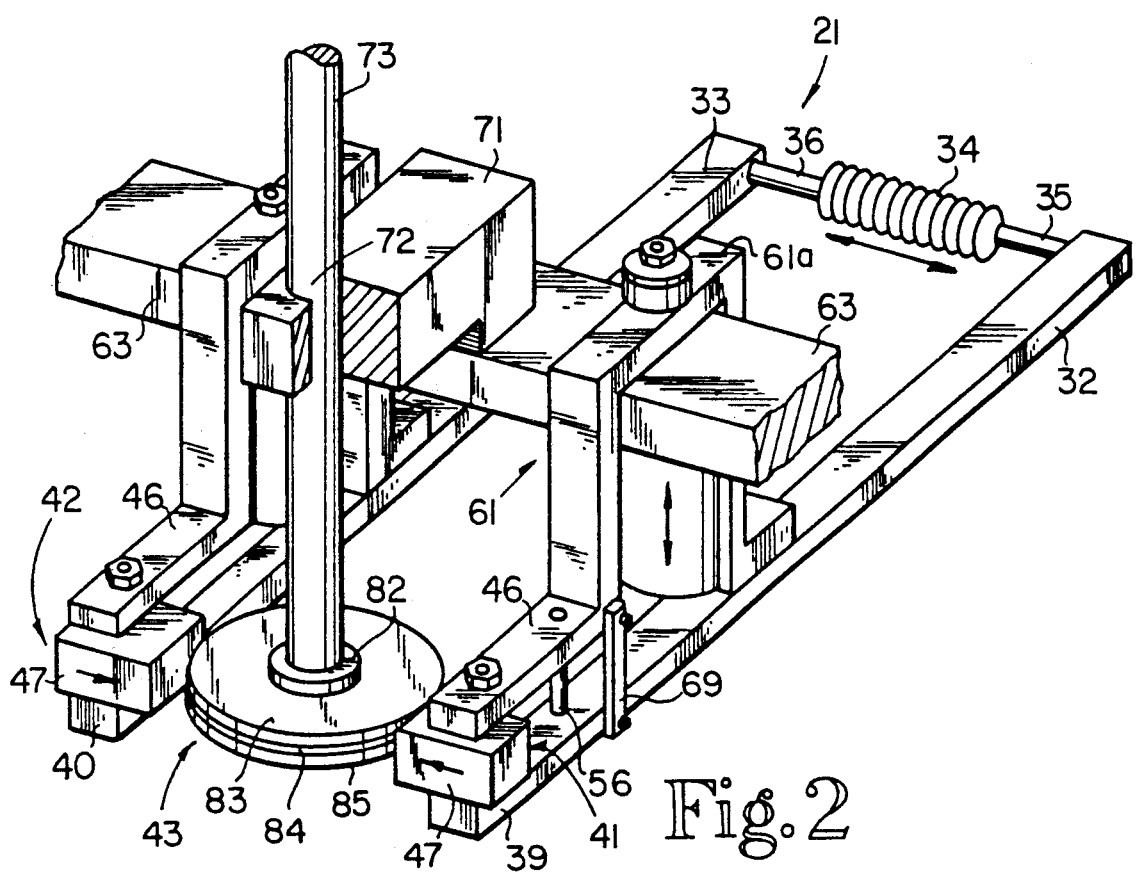
FIG. 2 is a diagrammatic perspective view of the main mechanical components of the FIG. 1 wear simulator.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is diagrammatically illustrated a wear simulator 20 which includes as the main components test fixture 21, heater unit 22, computer control module 23, drive motor 24, motor-sensor unit 25 and peristaltic pumps 26 and 27. These various components are interconnected into a unique wear simulator for piston rings and cylinder liners which is automated by computer control enabling a number of different environments to be created and for the wear testing and data gathering to be conducted automatically. Lines 23a-23d denote data lines interconnecting the computer control module with various sensors and controls in other portions of simulator 20.

Test fixture 21 (see FIGS. 2-6) includes a support base 31 which sets on the floor or bench top and provides a strong and stable platform for mounting or attachment of other components of the test fixture 21 and wear simulator 20. Test fixture 21 further includes a pair of load arms 32 and 33 which are attached at one end to dual piston air cylinder 34. Cylinder piston rod 35 is attached to the free end of arm 32 and cylinder piston rod 36 is attached to the free end of arm 33. The opposite ends 39 and 40 of arms 32 and 33, respectively, are each arranged as part of a corresponding liner holder 41 and 42, respectively, each of which securely clamps a portion of an actual cylinder liner and holds it in position against an actual piston ring. As illustrated, the two liner holders 41 and 42 are disposed on opposite sides (180° apart) of piston ring holder 43 which is generally circular and arranged so as to be driven in a reciprocating manner with the speed and stroke being selectable.

Figure 5A:
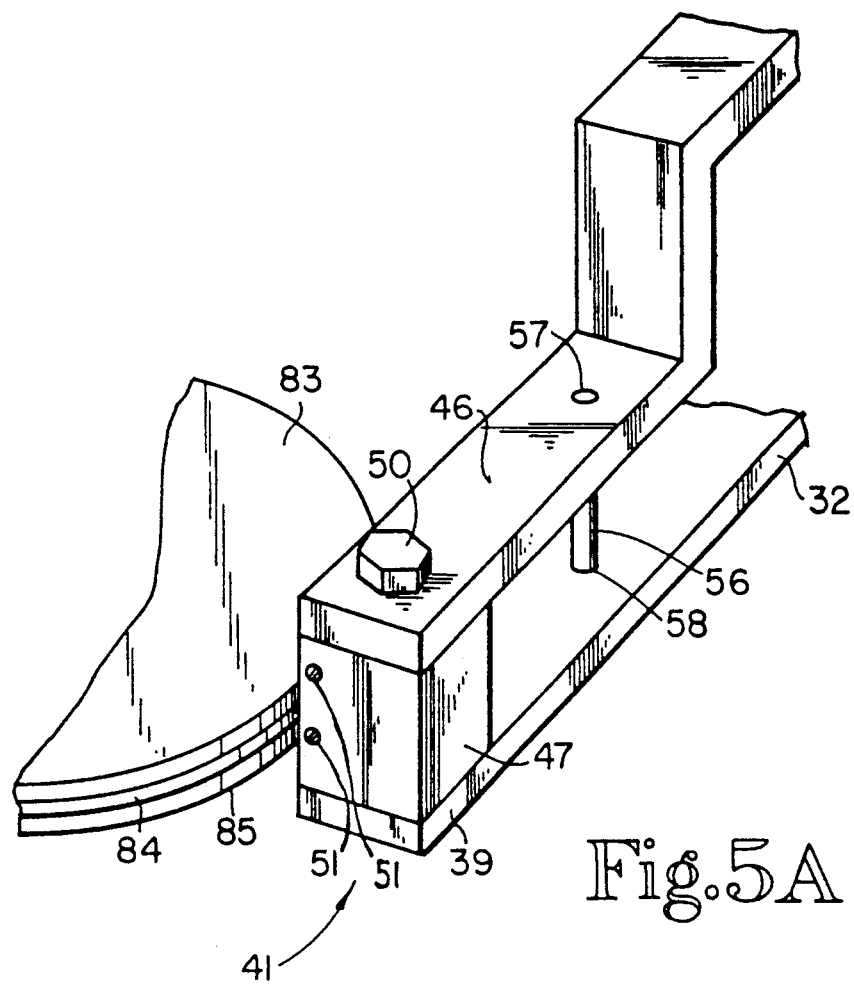
FIG. 5A is a partial perspective view of a cylinder liner holder comprising a portion of the FIG. 1 wear simulator.

Each liner holder (see FIGS. 5A and 5B) includes the end of the corresponding load arm, a top clamping arm and a receiving block. In FIG. 5A, holder 41 is illustrated and it is to be understood that liner holder 42 and the corresponding mechanical components relating to the assembly and use of holder 42 are virtually identical to that illustrated and described with regard to holder 41, only reversed in orientation such that both holders are directed inwardly so as to position their respective liner portions against the piston ring received in holder 43. End 39 of load arm 32 has a generally rectangular solid shape and may be made from bar stock and top clamping arm 46 has a similar width and thickness.

Figure 5B:
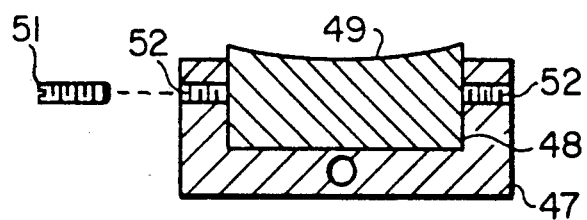
FIG. 5B is a partial top plan view of the FIG. 5A cylinder liner holder in full section detailing the received cylinder liner portion.

Receiving block 47 (see FIG. 5B) is machined with a receiving pocket 48 which snugly receives, though without interference, cylinder liner portion 49. FIG. 5B is achieved by taking a horizontal cutting plane through the center of block 47 and viewing the result as a top plan view in full section. Block 47 is securely clamped in position between end 39 and arm 46 by hex head bolt 50 and a nut on the underside (not shown). The liner portion 49 is securely fixed within the holder by the use of four set screws 51 arranged in a spaced vertical stack with two screws on each side, each threading into one of the four internally threaded holes 52. Any clearance within pocket 48 relative to portion 49 can be picked up by the use of the four set screws 51 and fine-tuning adjustments can be made using these screws in order to guarantee that the wear surface of the liner portion is precisely positioned relative to the piston ring in holder 43. The cylinder liners can be regarded as self-aligning by following the procedure of first positioning the piston ring between the two liner holders. The next step is to nominally secure the liner portions in each holder, but not yet fully tightening the four set screws. Next the air cylinder is energized so as to force the liner portions into contact against the piston ring. The matching contours of the piston ring and liners allows the contact force of the ring against the liner portions to align those portions to the precise position required. Thereafter the four set screws can be fully tightened.

One advantage of the present invention is the ability to use a portion of an actual cylinder liner in the wear simulator 20. This ability eliminates any error which could otherwise be introduced by trying to create a test sample liner representative of an actual liner. By means of the clamping arrangement and receiving block design of FIGS. 5A and 5B, all that is required is to cut a portion of an actual cylinder liner, machine it to the desired height and width and place it in receiving block 47. Squaring up and securing the liner is easily accomplished with the four set screws.

Arm 32 and arm 46 (and similarly arm 33 and a corresponding second arm 46) are further secured together or braced by means of pin 56. Pin 56 makes a snug sliding fit with holes 57 and 58 and insures that pressure forces introduced against the liner due to friction with the piston will be reliably picked up and sensed by a pair of strain gauges, one each being secured to each top clamping arm and this reliable pickup will occur regardless of the reciprocating position of the piston ring relative to the axial height of the cylinder liner portion in holder 41. It is important that arms 32 and 46 (and arms 33 and 46) do not experience any deflection, side forces or twist relative to each other regardless of what forces may act on these arms during the test.

Air cylinder 34 is arranged with a rotary valve and electric motor (not shown) which controls the amount of air Pressure. A torque sensor (not shown) positioned between arms 32 and 33 is calibrated against air pressure so that the air Pressure reading can be accurately correlated to the torque. This arrangement enables the air cylinder to be controlled so as to generate the required torque, noting that a torque setting is an equipment specification and established for each cylinder.

In order for the movement or position of cylinder piston rods 35 and 36 to control the position or contact of the cylinder liner relative to the piston ring, pivot points are necessary for the load arms 32 and 33 (one point for each arm) and are positioned between the opposite ends of each arm such that as the cylinder piston rods extend outwardly, ends 39 and 40 are moved inwardly, positioning the liner portions closer to the piston ring in holder 43. In this manner, by control of the air pressure of cylinder 34, the liners can be precisely controlled as to their position relative to the piston ring and the degree of contact force. The pivot point construction that enables the foregoing described action is illustrated for arms 32 and 46 in FIG. 3. It is to be understood that virtually the identical configuration is used on the opposite side of piston ring holder 43 for arm 33.

Figure 3:
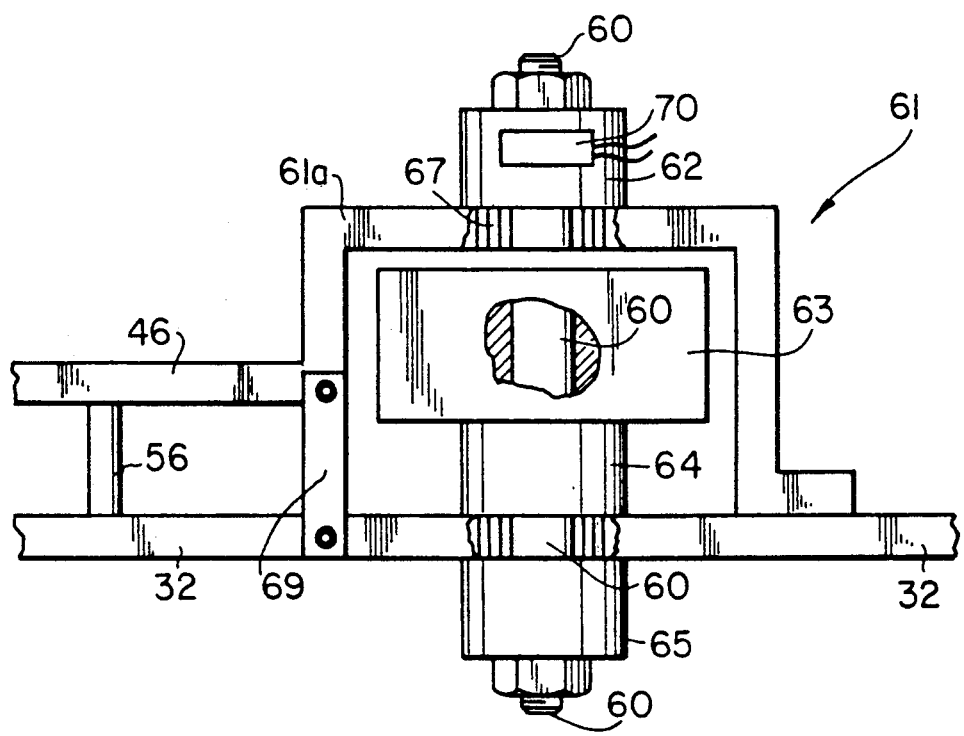
FIG. 3 is a partial, fragmentary, diagrammatic side elevational view of a strain gauge arm and frame assembly comprising a portion of the FIG. 1 wear simulator.
Figure 4A:
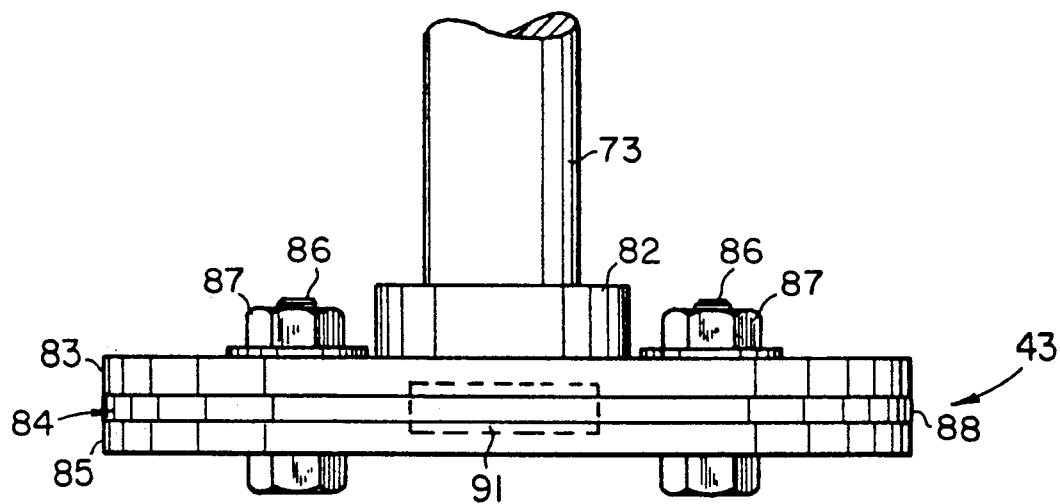
FIG. 4A is a front elevational view of a piston ring holder comprising a portion of the FIG. 1 wear simulator.
Figure 4B:
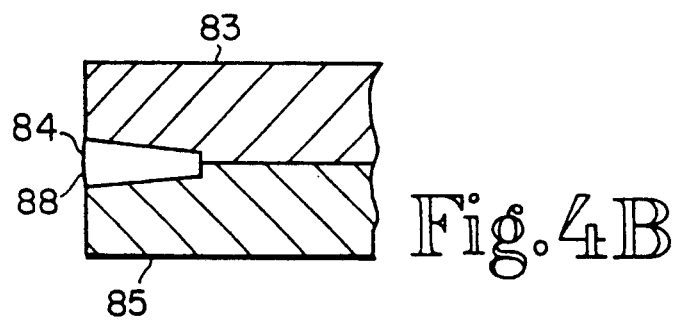
FIG. 4B is a partial front elevational view in full section of the FIG. 4A piston ring holder.
Figure 4C:
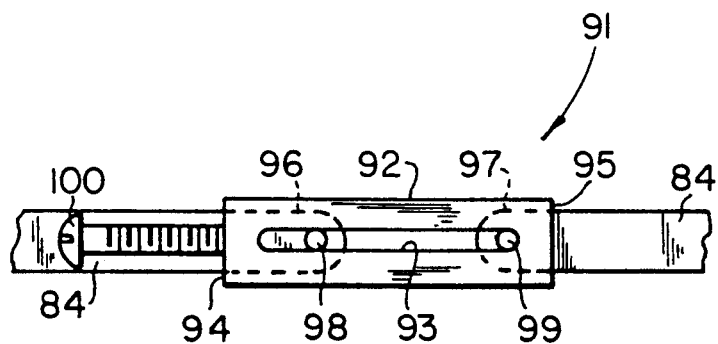
FIG. 4C is a front elevational view of a clamping mechanism comprising a portion of the FIG. 4A piston ring holder.

Referring to FIG. 3, the pivot point for load arm 32 is illustrated in greater detail and includes pivot rod 60 which extends through arm 32 and the step portion 61 of arm 46. As illustrated, arm 46 which is used to clamp the corresponding liner holder in position, in combination with arm 32, has a step portion created by two vertical walls and a connecting horizontal portion. Pivot rod 60, which is externally threaded at each end, extends through a first thrust bearing 62 mounted atop horizontal portion 61a. The rod next extends through portion 61a, support block 63, a second thrust bearing 64, arm 32 and finally a third thrust bearing 65. The free ends of support block 63 are bolted to upright members 66 which in turn are secured to support base 31.

Received within portion 61a is a first needle bearing 67 and received within arm 32 is a second needle bearing 68. Bracket 69 which is bolted to the arm 46-portion 61 corner and to arm 32 provides additional strength and rigidity to this dual arm arrangement. Strain gauge 70 is mounted directly to the outer surface of thrust bearing 62 and provides electrical signals representative of deflection in arm 46 which in turn is the result of frictional forces between the piston ring and liner portions as the piston ring reciprocates. The variables which are introduced into simulator 20 such as speed, loads, materials, temperatures and lubricants can all be related by the electrical signals provided by the strain gauge and by actual measurements taken from the piston ring and cylinder liner portions before and after the various tests are conducted. The free ends of pivot rod 60 each threadedly receive a hex nut which is used to secure the entire stack of component parts and bearings in the configuration and positions illustrated in FIG. 3.

Rigidly secured to support block 63 is a guide block 71 which includes a bearing sleeved cylindrical bore 72 which receives shaft 73 with a close, precision sliding or bearing fit. The top end 74 of shaft 73 is arranged with a freely rotatable pivotal connection at point 75 and at that point is attached to crank arm 76. The opposite end 77 of crank arm 76 is pivotally connected directly to the front output shaft 79 of drive motor 24 at a location off axis. As an alternative to this approach a connecting link can be used between the axis of shaft 79 and end 77 of arm 76. These two mounting techniques are functionally equivalent. As should be understood, as the motor shaft rotates, the off axis point (or link) rotates and moves crank arm 76 in a reciprocating fashion, though with some angularity in view of the linkage connection. In turn, shaft 73 moves in a true axial reciprocating fashion along the longitudinal axis of the shaft due to being guided by the sleeve bearing in bore 72. By changing the length of crank arm 76 or the degree of off set or by use of a link the stroke of shaft 73 may be changed. In order to facilitate making stroke length changes the connections to each end of arm 76 (and link) need to be designed for easy disconnect. The lower end of shaft 73 is rigidly secured to hub 82 which is part of top plate 83 of piston ring holder 43 (see FIGS. 4A, 4B and 4C).

Piston ring holder 43 includes two clamping plates which hold an actual piston ring 84 in position so as to move in a reciprocating manner between and within the two cylinder liner portions. Top plate 83 and bottom plate 85 are virtually identical to each other with the exception of hub 82 which is needed on the top plate in order to receive and securely attach to shaft 73. The two plates are held together by a spaced-apart series of hex head bolts 86 and hex nuts 87. Although the two plates have a line-to-line fit internally, their outer edges are machined with a bevel and vertical edge clearance (see FIG. 4B) in order to match the inner surface shape and contour of an actual piston ring such as ring 84. The outer edge 88 of the piston ring extends beyond the outer edges of plates 83 and 85 by only a few thousandths of an inch, in the range of five to ten thousandths.

In order to complete the assembly of the piston ring and plates, a circumferential clamp 91 is used. Clamp 91 includes an open block 92 with a clearance slot 93 on the front face and an internally threaded hole 94 through one end. The opposite end is closed and the block fits over the free ends 96 and 97 of piston ring 84. These piston ring ends are shown generally in broken line form inasmuchas the majority of these ring ends are hidden from view by the overlaying block 92. Pins 98 and 99 are inserted through the clearance slot 93 and into the piston ring end openings. In order to draw the piston ring ends toward each other until the piston ring has achieved its proper in-actual-use circumferential size, screw 100 is threaded into hole 94 and pushes against pin 98. This action initially pushes pin 99 against the far end of slot 93 and continued advancing of screw 100 draws the piston ring ends toward each other thereby enabling the user to establish a proper and consistent circumferential size. A nut (not shown) may be used on screw 100 as a tightened abutment against the outer surface of block 92 in order to lock the screw in its desired position.

Drive motor 24 (see FIG. 1) includes a 360-tooth gear attached to the motor shaft at the back end opposite to output shaft 79. This gear is cooperatively arranged with motor sensor unit 25 which includes two sensing capabilities. One sensing capability is based on a Hall effect magnetic configuration tied to the position of each gear tooth as the gear rotates. The other sensing capability is based on an ultraviolet light source and sensor wherein the gear teeth actually disrupt or break the light path between the source and sensor as the gear rotates. The Hall effect sensor is used to generate an analog signal as to where the piston ring is positioned in the reciprocating cycle. The light sensor serves as a gear tooth counter and generates an analog signal of the speed of the motor and the reciprocation of shaft 73.

Based upon what has been described so far, it should be clear that wear simulator 20 is able to use an actual piston ring 84 in combination with portions of actual cylinder liners 49. A drive motor is arranged in order to create a reciprocating piston ring to cylinder action and the initial torque setting corresponds to the vehicle specifications. By varying the motor speed, different vehicle speeds can be simulated. As the piston ring reciprocates in the liners, the friction between the piston ring and liners is translated into deflection of the arms holding the cylinder liner portions which in turn translates into an analog signal from the strain gauges. Since the position of the piston ring is known at any instant, it is possible to chart with reasonable accuracy the friction at any instant relative to reciprocating speed and position of the piston ring. There are, however, other factors which are part of a reciprocating engine environment such as temperature and the specific lubrication. In order to be able to simulate these conditions and experiment with different lubrications and how those lubrications perform under various conditions, two peristaltic pumps 26 and 27 are provided as well as a heater unit 22 which is positioned in close proximity to the piston ring and liners and is enclosed so as to create a controlled temperature environment.

Figure 6:
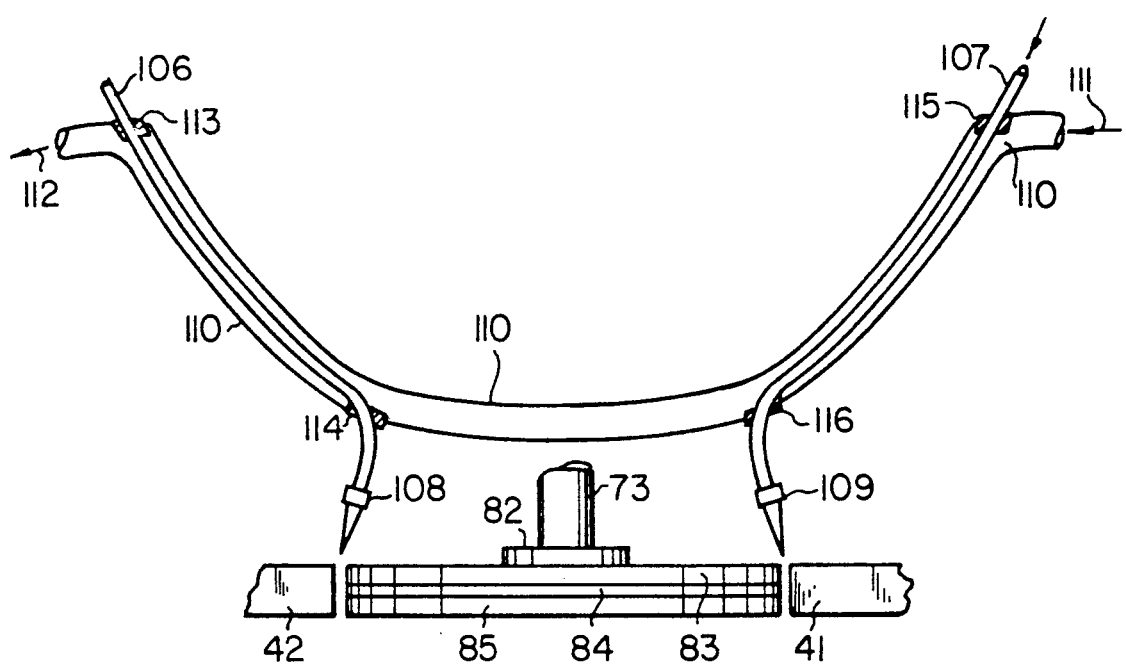
FIG. 6 is a front elevational view of a portion of the oil delivery system which comprises a portion of the FIG. 1 simulator.

Each pump 26 and 27 is connected in flow communication with a supply reservoir of lubrication (not shown) which supplies, on a continuous basis, lubrication to the pumps. Each pump is manually adjusted to a precise delivery rate or volume. The feed lines, line 106 for pump 26 and line 107 for pump 27, are routed into the interface areas between the piston ring holder 43 and liner holders 41 and 42. As illustrated in FIG. 6, line 106 is in flow communication with spray needle tip 108 at its distal end and tip 108 is directed to the interface between the piston ring holder 43 and liner holder 42. In a virtually identical fashion, liner 107 is in flow communication with spray needle tip 109 which is directed to the interface between holder 43 and holder 41. Spray needle tips 108 and 109 create a spray mist of lubrication directed to the specific point of friction and thus wear between the piston ring and cylinder liners receives the selected lubrication. Cooling for the flowing lubrication from the pumps to the needle tips is provided by recirculating water in cold water conduit 110. Incoming water is represented by arrow 111 and exiting water is represented by arrow 112. Line 106 enters conduit 110 at sealed entry 113 and exits at sealed entry 114. Line 107 enters conduit 110 at sealed entry 115 and exits at sealed exit 114.

Heater unit 22 includes a silicon controlled rectifier (SCR) heating unit 120 which is partially covered by metal shelf 121. The shelf acts as a heat radiating surface and the heating unit is computer controlled to proportionally supply power as needed to maintain a desired temperature surrounding the piston ring and cylinder liners. Safety limit control (automatic cut-off) is provided so that the temperature cannot exceed a maximum temperature. Thermocouples are used to generate an analog signal of the actual temperature in the area surrounding the piston ring and liners. In order to control this temperature in a more uniform manner and to minimize heat losses, a thermally insulated enclosure 122 (partially illustrated) is disposed completely around the piston ring holder and the two liner holders with a clearance slot in the top wall in order to allow shaft 73 to reciprocate axially.

Figure 7:
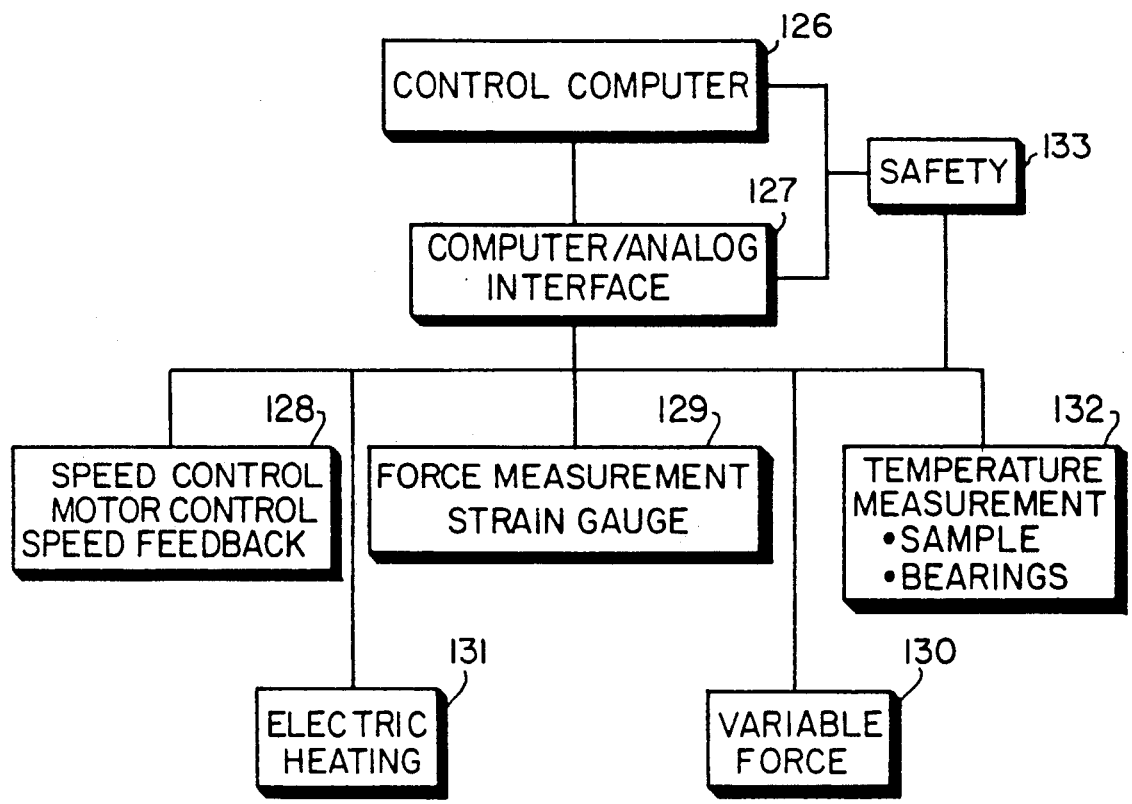
FIG. 7 is a block diagram of the computer control interconnect and data gathering and monitoring capabilities of the FIG. 1 wear simulator.

Referring to FIG. 7, there is illustrated a block diagram which generally details system features and data lines of wear simulator 20. The computer control module 23 is shown as consisting of two main portions, control computer 126 and computer/analog interface 127. These portions receive and monitor analog data from the remote stations such as the motor sensor unit represented by block 128, the strain gauge force measurement represented by block 129, the air cylinder force (torque) represented by block 130, heating unit 120 data and control signals represented by block 131 and general temperature sensing at any critical point represented by block 132. Block 133 represents safety limit monitoring and control such that motor speed, piston area temperature, bearing temperature, etc. cannot run out of control and exceed preselected or predetermined limits.

Figure 7A:
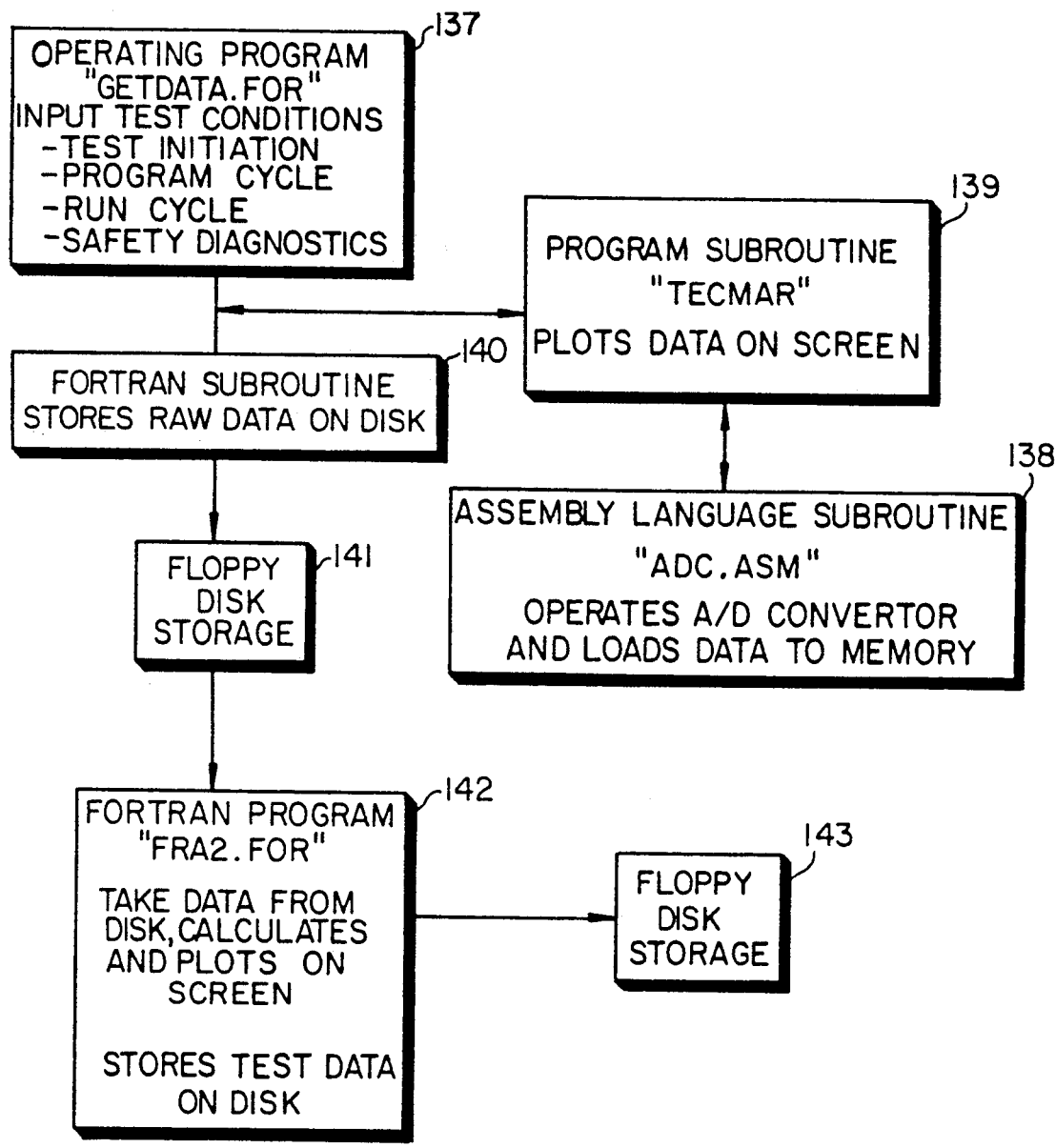
FIG. 7A is a block diagram of data acquisition software suitable for use with the controller of the present invention.

Referring to FIG. 7A there is illustrated a block diagram representative of simulator control software. Block 137 provides the operating program, a fortran program entitled "GETDATA.FOR", which is used to start-up and control the operation of the simulator through a dedicated computer. The initiation or start-up operation consists of a standard routine which turns on and warms-up the system electronics and checks the output from the operating control sensors such as thermocouples, pressure transducers, power input (heaters and drive motor), etc.

The operating program offers a menu which allows the desired operating or test cycle to be input. This includes a broad range and/or combination of conditions such as temperatures, loads, speeds with varying data acquisition rates to be run automatically along with data storage.

The operating program of block 137 also contains safety/diagnostic monitoring software which automatically sets parametric limits and protects the tester from damage during operation. This system monitors drive motor operating speeds, maximum temperatures in the ring-liner components area, maximum stress (friction) at ring-liner wear interfaces, etc.

Block 138 represents the function of real time data conversion and modification and the assembly language subroutine entitled "ADC.ASM", operates an A/D (analog-digital) convertor. The analog data from the operating system control sensors such as temperature, pressures, speeds, etc. are converted during tester operation to digital data and stored for further use in the working memory of the system's control computer.

Block 139 represents the function of real time data reduction and uses a fortran subroutine entitled "TACMAR" which accesses the digitized data from the computer's working memory and plots it on the monitor screen in real time. This allows the simulator's performance to be monitored on-line during operation. This includes friction vs. time, rpm of drive motor, temperature of ring interface, etc.

Block 140 represents the function of data storage and/or modification of stored data and uses another fortran subroutine to condition, transfer, and store the data from the control computer's working memory to a floppy disk which is denoted by block 141.

Block 142 represents the function of access, manipulation and storage of data from a floppy disk using a fortran program entitled "FRA2.FOR". After accessing data from the floppy disk storage this function plots and/or otherwise manipulates this data for display on the monitor screen or storage on a floppy disk denoted by block 143.

Prior to discussion of the test results obtained with wear simulator 20 for specific materials and conditions, a general overview of the simulator is provided hereinafter giving some additional specifics and clarifying aspects of the operation of the simulator. The simulator 20 incorporates a complete piston ring positioned in a disk shaped holder. The ring ends are held together by pins and clamped to the nominal gap clearance. The holder with ring reciprocates with a stroke of 2.54 cm. Portions of the ring are loaded by two liner segments placed 180 degrees apart. Each stationary liner segment is about 3.8 cm long, 0.7 cm wide, and is cut from a finished liner. The ring holder is powered by a 1.34 kW DC electric motor that is speed controlled by a SCR controller. Load is applied to the ring/liner interface by means of the air cylinder 34 and lever arm arrangements 32 and 33. Provision is made for lubricant spray at the wear interface and the entire unit may be heated to as high as 550° C. in order to simulate advanced diesel top ring reversal temperatures. Data obtained from the simulator include friction force as a function of crank angle and average friction coefficient as a function of time. As is often done after such tests, liner samples may be analyzed for wear volume, surface finish, and other meaningful wear parameters. Simulator results are available for both right and left wear interfaces.

By pressurizing the air cylinder, ring loads are applied which can simulate the high pressures experienced in highly turbocharged engines under peak pressure conditions. Maximum reciprocating speed is limited to 700 rpm by inertia forces. In effect, the simulator attempts to duplicate the most severe ring and liner condition; namely low speed, high load at TDC firing. Most of the testing to date has been at speeds below 500 rpm. Higher speed operation, if desired, would require addition of a reciprocating balance mechanism.

The friction force is transduced by strain gauges mounted on both right and left arm pivots. This not only permits an independent friction measurement at both wear locations, but also eliminates unwanted bearing friction, inertia force, and noise from vibration.

As required, lubrication is provided by means of water cooled stainless steel tubes through which a pressurized air and oil mixture pass. The oil is provided as a spray mist directed at the sliding surfaces. A pair of peristaltic pumps, each capable of precise, variable feed rate, is used to control oil quantity. A double wall, insulated, stainless steel enclosure surrounds the liner samples and ring. Electric heaters are used to produce high temperatures. Heater control is by mean of the computer, which cycles the heaters. Thermocouples are employed at several points within the enclosure to indicate temperature. An angle encoder with 250 pulses per revolution is used to tell the computer when to sample the strain gauge force.

Friction coefficient is determined by dividing the measured friction force by the normal load provided by the air cylinder. Friction coefficient is calculated and stored every 1.4 degrees of crank rotation. The friction coefficient is also averaged over one revolution. Friction as a function of crank angle is displayed on the monitor screen of the computer control module for both right and left sides, and may be recorded on floppy disk at predetermined intervals. Three cycles are averaged prior to plotting and storing. Upon completion of the test, ring and liner profiles may be measured to determine wear volume, weight loss, and surface roughness as part of an overall assessment program. In the following disclosed test data liner and ring roughness profiles were taken in the axial direction of the liner, and liner weight loss determined. Ring weight loss is difficult to determine since only a portion of the ring is worn.

For process control, as well as data acquisition and analysis, a computer system is employed. Speed, load and test temperature as a function of time are input for the process control function. The simulator is capable of unattended operation over the prescribed cycle. While the results presented herein are for tests of 2 and 4 hours duration, tests of up to 20 hours have been conducted. Automatic shut-down occurs if variables exceed preset limits. Periodically, friction data is taken, displayed on the monitor screen, and stored on a flexible disk. Table I gives a list of the computer controlled features.

TABLE I

| AUTOMATED FEATURES OF WEAR SIMULATOR Measurement and Control Features | |
|---|---|
| Strain Gauge Force | Friction force stored digitally as a function of angular crank position. Unit stops if friction coefficient exceeds specified value. (Important for scuffing tests.) |
| Motor Speed | Speed monitored by angular position sensor and recorded. Speed Controlled from 50 to 700 rpm. Independent measurement for overspeed protection. |
| Loading Force | Air cylinder pressure monitored and recorded. Pressure regulator motorized. Load constant or ramped up to about 650N. |
| Oven Temperatures | Sample block temperature monitored for control, and recorded. Heaters cycled on and off based on control equations. Oven air sensed independently for over-temperature protection. Temperature up to 650° C. |
| System Integrity | Automatic shut-down after 10 seconds if no signals received from controller. |

In the following test data discussions, a comparison is made with results from both the Cameron Plint bench tester as well as fired engine tests. Results for potential advanced diesel components are given for a plasma sprayed chromium oxide ring and liner (a good combination as judged from engine tests) and a titanium carbide ring and chromium carbide liner (a poor combination). These components were tested at 427° C. under loaded conditions with and without lubrication. Results are compared to a production electroplated chromium ring and gray iron liner combinations.

In addition, results are presented for Cummins V-903 production engine components with a mineral oil based lubricant, CE/SF 15W40, and a polyol ester based synthetic lubricant, SE/CD 15W30. These results indicate the importance of the details of oil application on test repeatability, and more importantly demonstrates the ability of simulator 20 to distinguish and measure the differences between commercial oils. Below are presented baseline test results for lubricated production chrome plated ring and gray iron liner tested at 25° C. These results are compared with other material combinations which had been previously tested in an uncooled Cummins NTC 250 engine. These combinations were tested with and without lubrication at 427° C.; a temperature which would rapidly fail production materials, especially without lubrication. Table II gives the five combinations reported and the test condition under which they were run including load.

TABLE II
WEAR TEST MATERIAL COUPLES AND DATA

A. Simulator Data
1. Ring - Chrome Plate Liner - Grey Iron

| Lube | Temp | Liner Mean Wear Depth um | Liner Wear Coef mm$^3$/ mm/N | Fric Coef |
|---|---|---|---|---|
| Mineral | 25° C. | 1.5 | 1.9 × 10$^9$ | 0.05 |

2. Ring - Plasma Sprayed Cr$_2$O$_3$ Liner - Plasma Sprayed Cr$_2$O$_3$

| Lube | Temp | Liner Mean Wear Depth um | Liner Wear Coef mm$^3$/ mm/N | Fric Coef |
|---|---|---|---|---|
| None | 427 | <0.25 | <3 × 10$^{-10}$ | 0.55 |

3. Ring - TiC/CaF$_2$ Liner - Cr$_3$C$_2$

| Lube | Temp | Liner Mean Wear Depth um | Liner Wear Coef mm$^3$/ mm/N | Fric Coef |
|---|---|---|---|---|
| None | 427 | 35 | 4.5 × 10$^{-8}$ | 0.58 |

4. Ring - Plasma Sprayed Cr$_2$O$_3$ Liner - Plasma Sprayed Cr$_2$O$_3$

| Lube | Temp | Liner Mean Wear Depth um | Liner Wear Coef mm$^3$/ mm/N | Fric Coef |
|---|---|---|---|---|
| None | 427 | 35 | 4.5 × 10$^{-8}$ | 0.58 |
| Syn A | 427 | | | 0.15 |

5. Ring - TiC/CaF$_2$ Liner - Cr$_3$C$_2$

| Lube | Temp | Liner Mean Wear Depth um | Liner Wear Coef mm$^3$/ mm/N | Fric Coef |
|---|---|---|---|---|
| Syn A | 427 | | | 0.1 |

TABLE II-continued
WEAR TEST MATERIAL COUPLES AND DATA

Test Conditions:
Load - 124 N/cm  
Speed - 266 rpm  
Test Duration - 2 hours  
Oil Supply Rate - 1 ml/hr @ 25° C.  
10 ml/hr @ 427° C.

B. Cameron Plint Data
1. Ring - Chrome Plate Liner - Grey Iron

| Lube | Temp | Speed rpm | Load N | Liner Wear Coef mm$^3$/ mm/N | Fric Coef |
|---|---|---|---|---|---|
| Mineral | 25° C. | 600 | 100 (8N/mm) | 2.3 × 10$^{-9}$ | 0.16 |

2. Ring - Chrome Plate Liner - Grey Iron

| Lube | Temp | Speed rpm | Load N | Liner Wear Coef mm$^3$/ mm/N | Fric Coef |
|---|---|---|---|---|---|
| Mineral | 25 | 1200 | 250 (20N/mm) | 1.4 × 10$^{-11}$ | 0.06 |

3. Ring - TiC/CaF$_2$ Liner - Cr$_3$C$_2$

| Lube | Temp | Speed rpm | Load N | Liner Wear Coef mm$^3$/ mm/N | Fric Coef |
|---|---|---|---|---|---|
| None | 360 | 360 | 250 (20N/mm) | 1.9 × 10$^{-8}$ | 1.45 |

Comparisons with Cameron Plint and firing engine tests are made.

BASE LINE RING/LINER RESULTS

Figure 8:
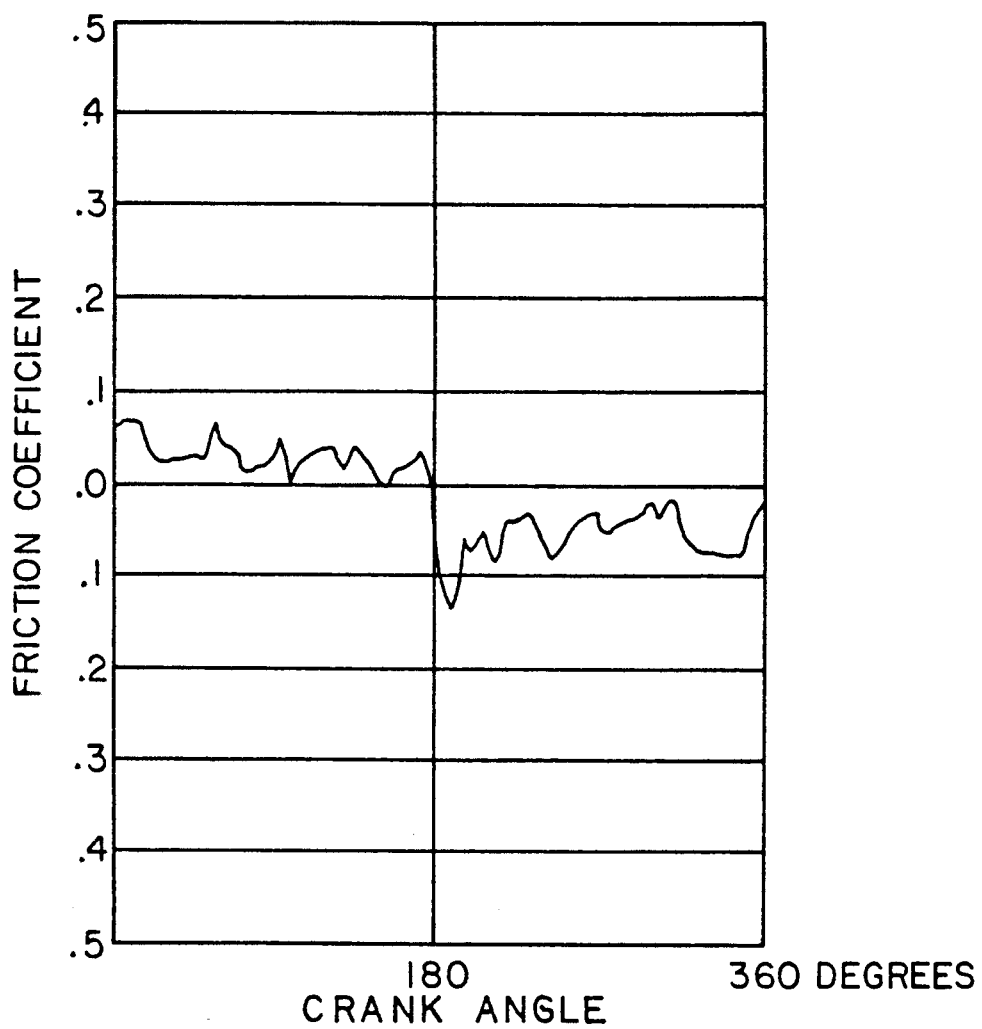
FIG. 8 is a graph detailing the relationship between friction coefficient and crank angle.
Figure 9:
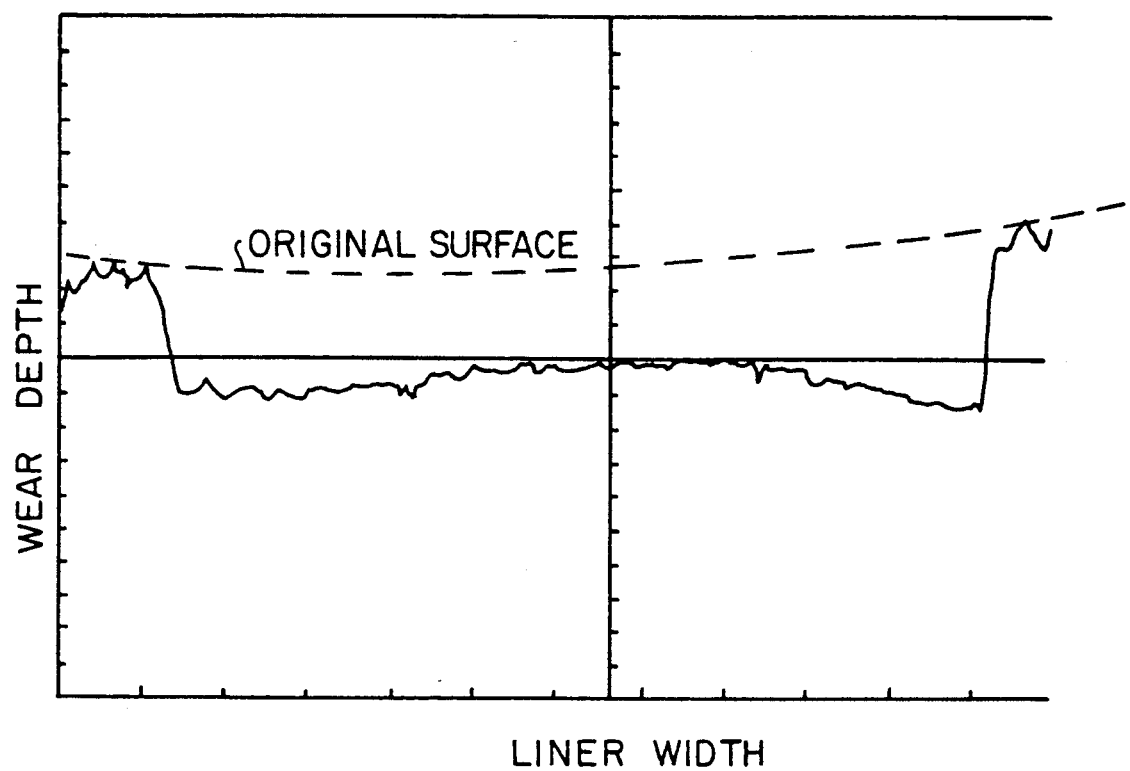
FIG. 9 is a graph displaying data of a liner tested against a chrome-plated ring.
Figure 10:
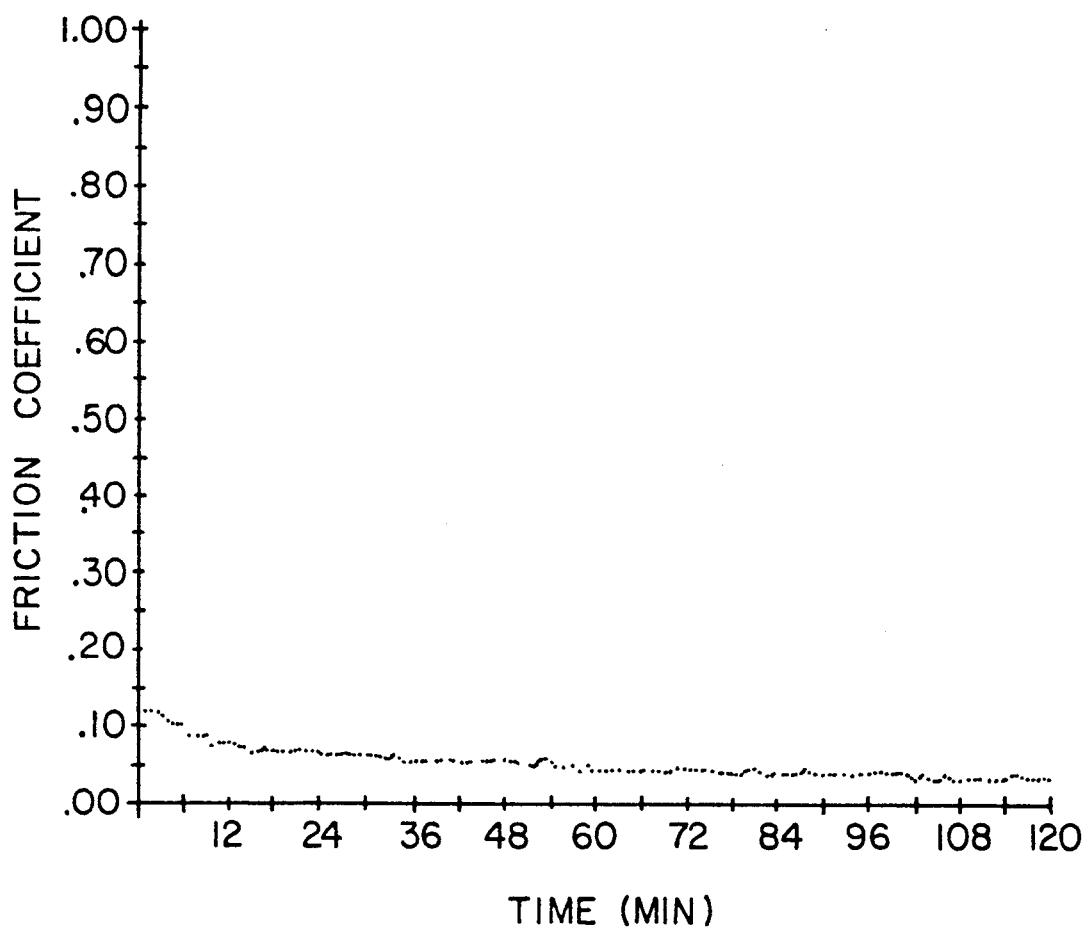
FIG. 10 is a graph detailing the average friction coefficient over the length of the test cycle.

FIGS. 8, 9 and 10 show baseline results with the production chrome plated top ring. Test temperature was 25° C. and nominal force 85.4 N on the liner segment whose width was 0.69 cm. The speed was 268 rpm. This provided a load of 125 N/cm. FIG. 8 shows friction coefficient as a function of crank angle over the 360° stroke. The coefficient is the average of right and left sides. The oscillations seen on the trace arise from vibrations brought on by the relatively heavy mass of the reciprocating ring holder and the compliant structure of the reciprocating mechanism. The average friction coefficient over the cycle shown was approximately 0.04, which suggests lubrication was predominantly EHD.

FIG. 9 shows the liner sample surface profile as a function of sample length. This measurement was made with a Sheffield Surface Proficorder, Model RLC 7. The recessed portion of the trace, which is the length of the 2.54 cm stroke, shows the total wear. Note that the wear is greater near the dead centers and less near the center of travel, perhaps showing a transition from boundary to EHD/mixed lubrication as the ring velocity increased. The lubrication used is mineral oil and the sample interval is 7.4 μm.

FIG. 10 shows how the average friction coefficient changed with time as the test continued. There was a substantial drop in friction coefficient as the break-in process occurred, reaching a level of about 0.055.

TITANIUM CARBIDE RING AND CHROMIUM CARBIDE LINER COATINGS

Figure 11:
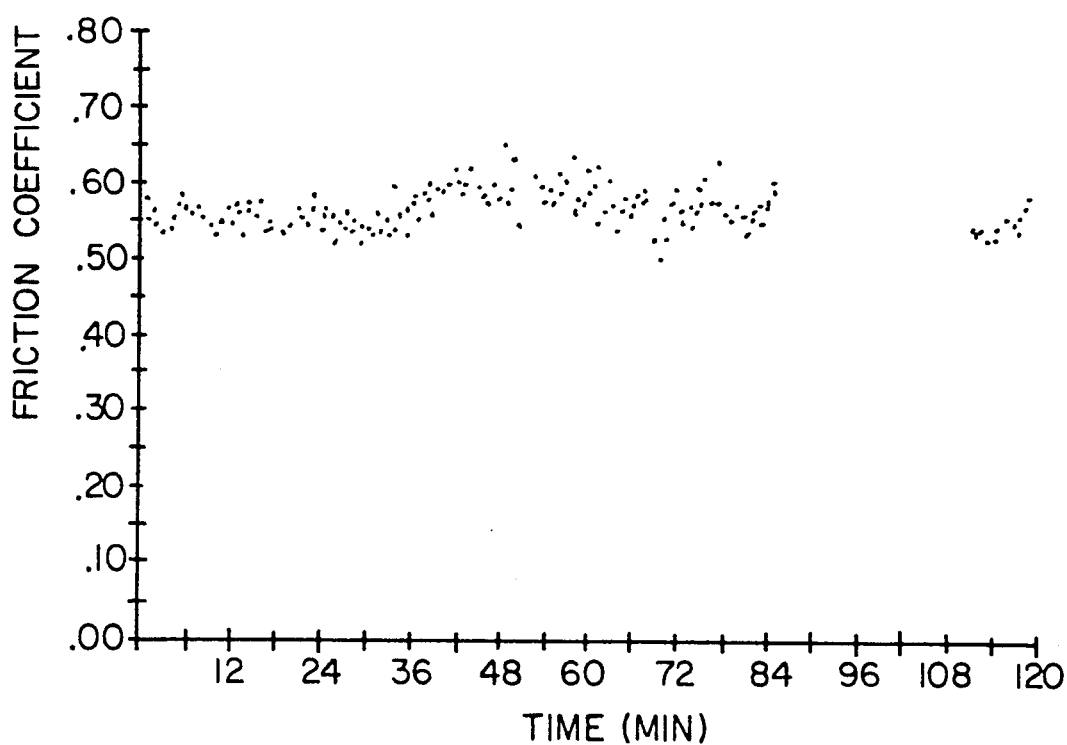
FIG. 11 is a graph detailing the average friction coefficient involving different materials, without lubrication.

For coated components sample temperature were set to 427° C. and load maintained at 85.4 N/cm. Two hour tests were run. FIG. 11 shows average friction coefficient results for the titanium carbide ring on the chromium carbide liner without lubrication. This is combination 3 in Table II. There was no change in friction coefficient as the test progressed. The average value remained quite high at 0.58.

Figure 12:
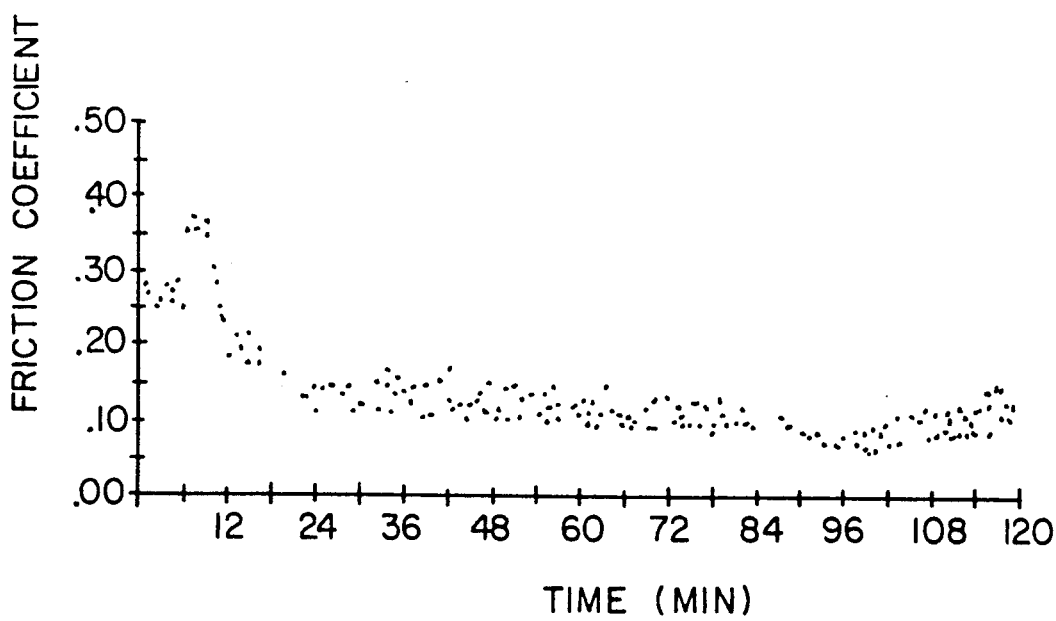
FIG. 12 is a graph detailing the average friction coefficient with the materials of the FIG. 11 graph, using a synthetic lubricant.

The friction coefficient dropped significantly with time when the synthetic oil was used (see FIG. 12). This is combination 5 in Table II. After two hours the friction coefficient dropped to about 0.1, indicating predominantly boundary lubrication.

Figure 13:
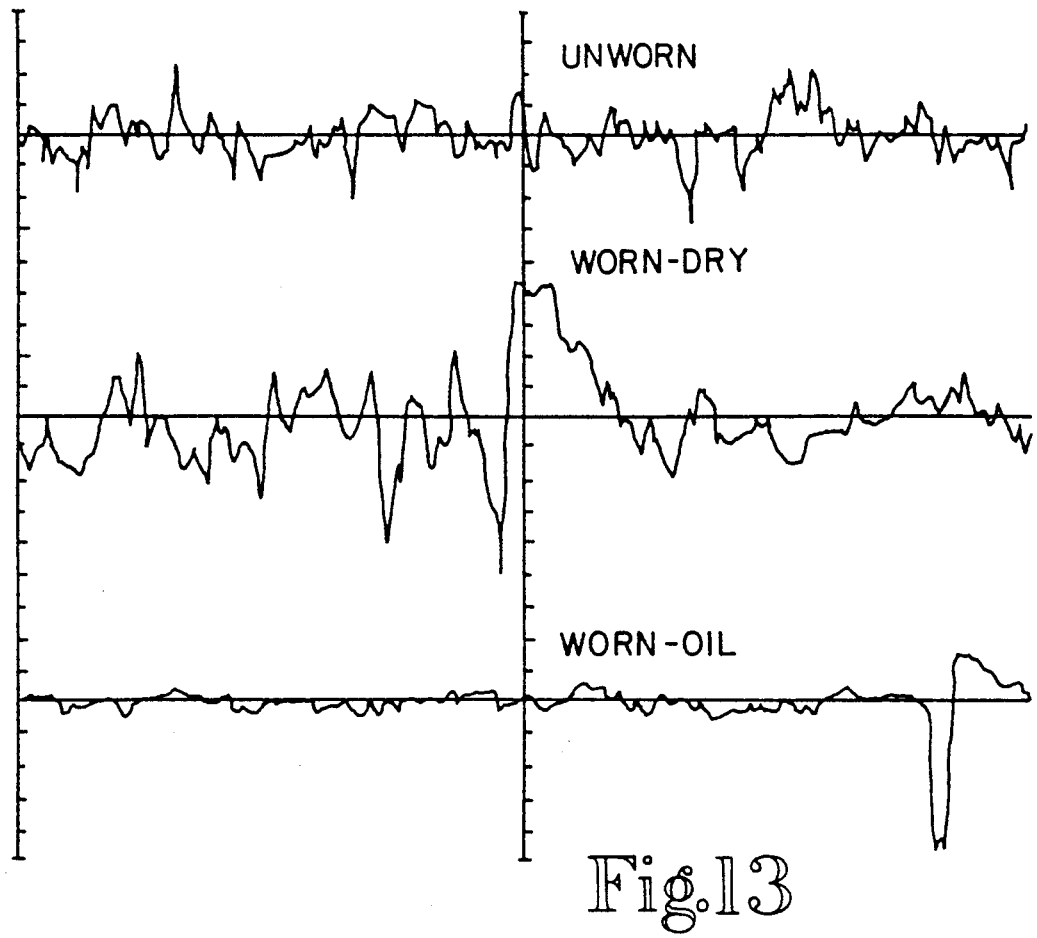
FIG. 13 is a graph comparing roughness traces of plasma sprayed chromium carbide liners.

FIG. 13 shows Proficorder surface roughness traces of the fresh liner surface, and for two worn samples after the two hour test. One sample was worn dry, and the other with the synthetic lubricant. The unworn surface was relatively rough. The lubricated sample was smoothed considerably when worn, but the unlubricated sample was further roughened.

The data in FIG. 12 showed the AC components of the surface roughness. FIG. 13 shows the DC components. The extent of material removal is apparent along the 2.54 cm wear scar. Clearly the amount of material removed was less when lubricated.

PLASMA SPRAYED CHROMIUM OXIDE RING AND LINER COATINGS

Figure 15:
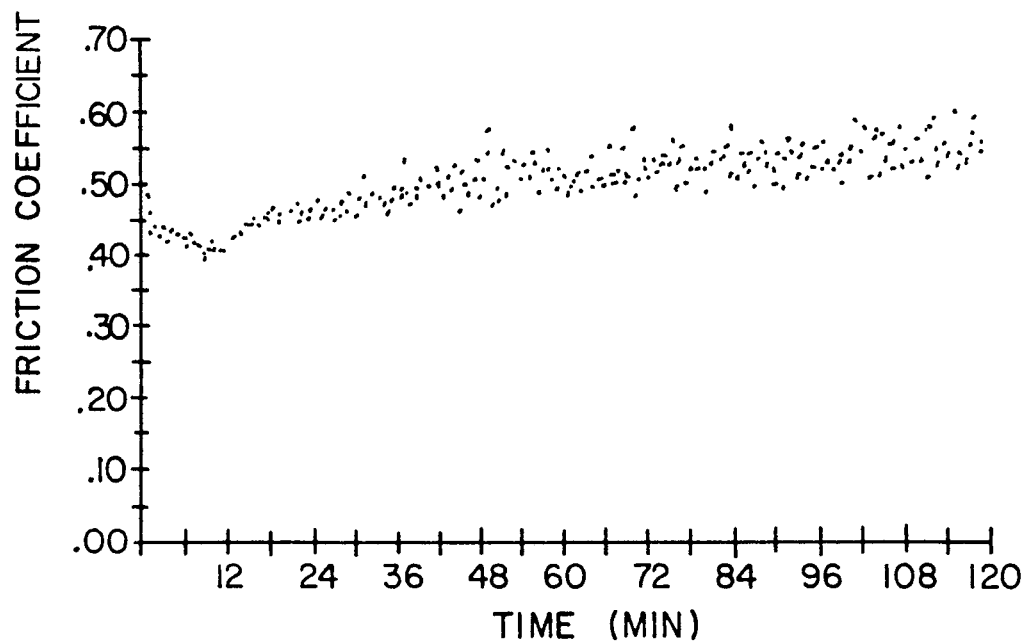
FIG. 15 is a graph detailing average friction coefficient over the time of the test.

FIG. 15 shows average friction coefficient results from the simulator for plasma sprayed chromium oxide ring and plasma sprayed chromium oxide liner coatings, without lubrication at 427° C. Note that the friction coefficient increased somewhat during the course of the test. This is combination 2 of Table II. After two hours of testing the friction coefficient reached 0.55.

Figure 16:
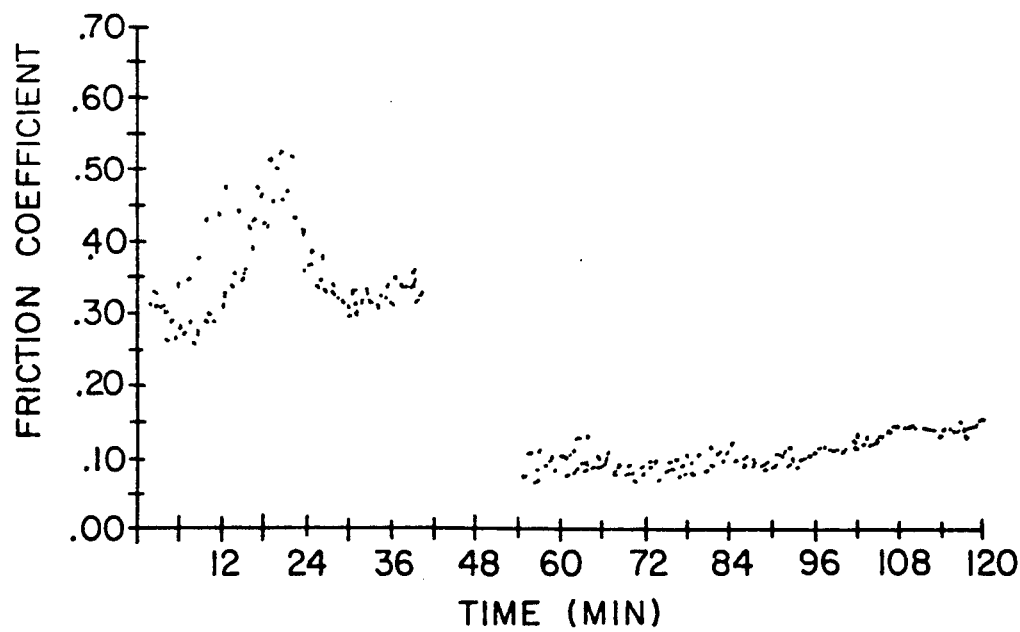
FIG. 16 is a graph detailing the average friction coefficient over the length of tests for the same materials of FIG. 15, using a synthetic lubricant.

The use of synthetic oil reduced the friction coefficient significantly (FIG. 16). This is combination 4 of Table I. After two hours the friction coefficient averaged about 0.15. Wear rates were too low to be measurable, but significant surface smoothing occurred.

Figure 14:
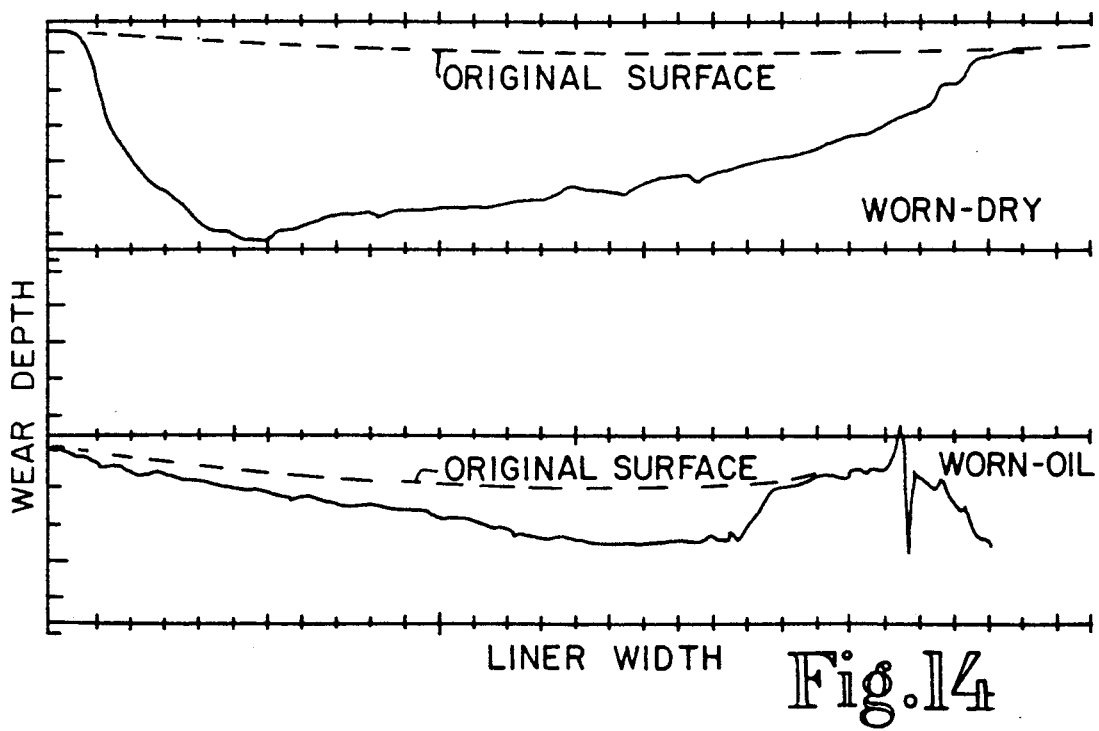
FIG. 14 is a graph detailing wear scar geometry on the worn chromium carbide liners.
Figure 17:
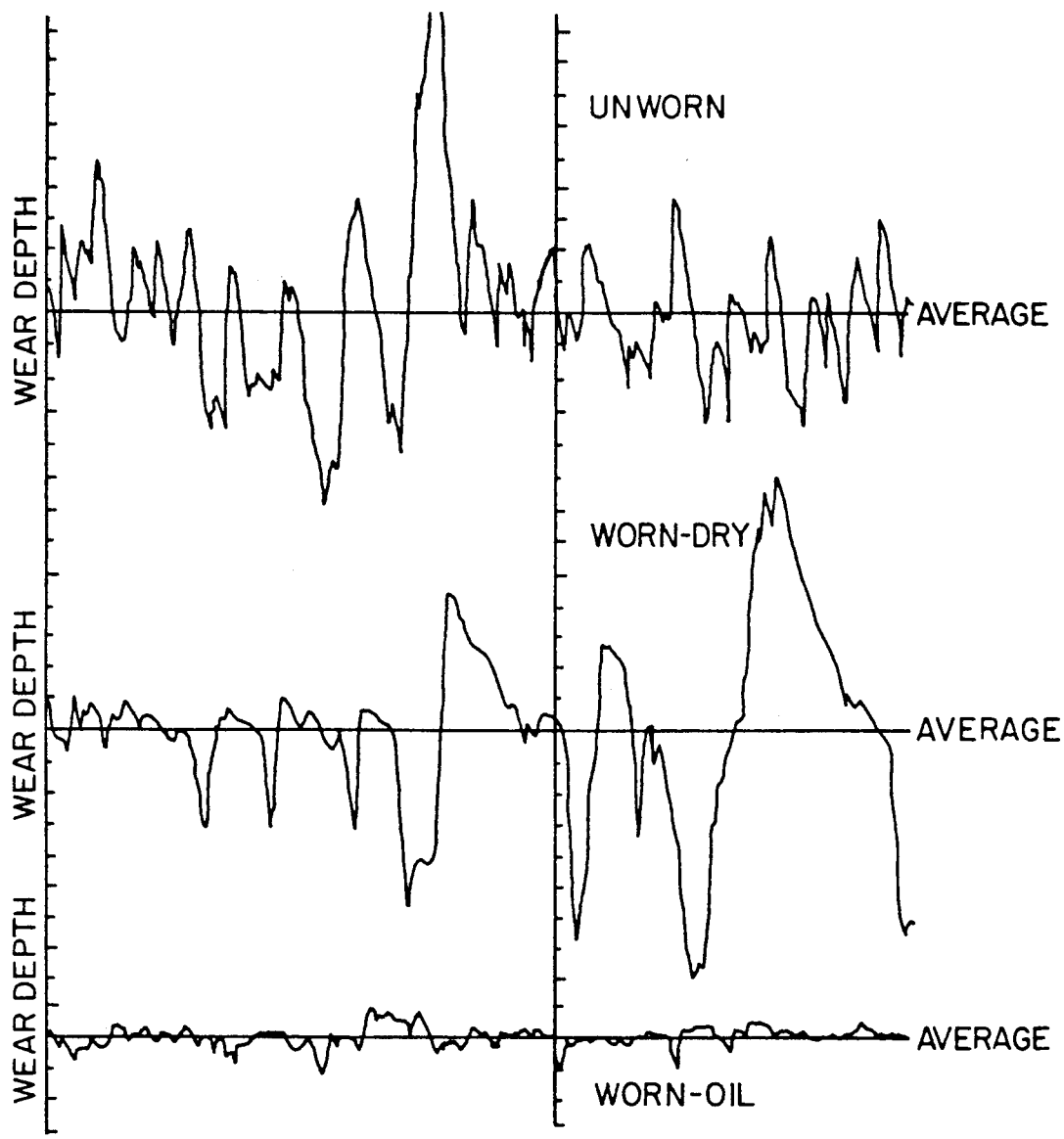
FIG. 17 is a graph detailing roughness traces of plasma sprayed chromium oxide liners before and after wear testing.

FIG. 16 and 17 show Proficorder measurements for the chromium oxide samples similar to those shown in FIGS. 13 and 14 for the chromium carbide specimens. In viewing FIG. 16, it is apparent that significant smoothing occurred when the synthetic lubricant was used, and little change occurred when run dry. FIG. 17 shows that very little material was removed in either case.

In comparison with the titanium carbide, chromium carbide results of FIG. 11, this combination showed relatively little surface wear or roughness increase throughout the entire stroke. We may conclude that the simulator ranks this material to be relatively durable under these severe operating conditions. The one apparent negative is the very high friction coefficient of the chromium oxide rubbing surfaces when run dry, although it is not significantly different from that of the chromium carbide, titanium carbide pair.

COMPARISON WITH CAMERON PLINT

Figure 19:
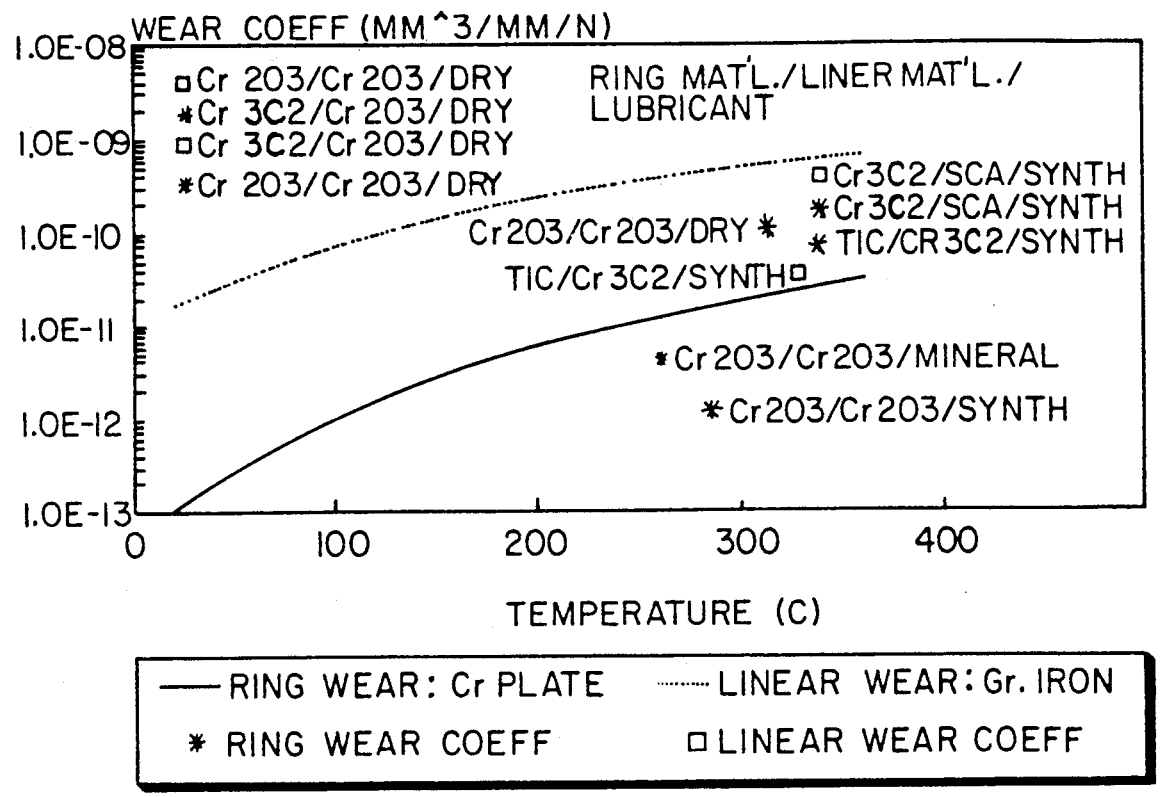
FIG. 19 is a graph detailing ring and liner wear coefficients from Cameron Plint tests.
Figure 18:
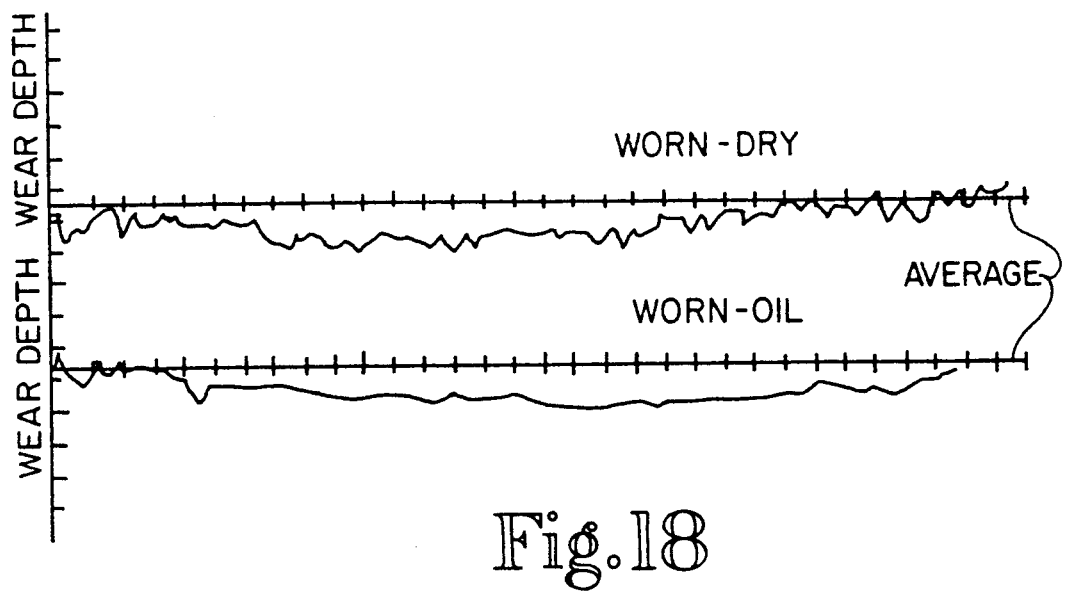
FIG. 18 is a graph detailing wear scar geometry on worn chromium oxide liner samples.

A comparison of these results with Cameron Plint (TE 77) data measured will now be made. FIG. 19 shows the Cameron Plint results for a variety of material pairs in terms of wear coefficient as a function of temperature. The wear coefficient is defined as the volume of liner removed (cubic millimeters) per millimeter of sliding distance per Newton of force imposed. Note that the conventional chrome plated, gray iron combination on the lower left-hand corner of the graph gave values of about 3 to $6 \times 10^{-12}$ in the temperature range of 150–200° C. Such temperatures would be considered normal for highly turbocharged engines. As temperature increased the conventional chrome plated, gray iron combination deteriorated significantly, giving a wear coefficient of about $3 \times 10^{-11}$ at 350° C.

COMPARISON WITH ENGINE RESULTS

Figure 20:
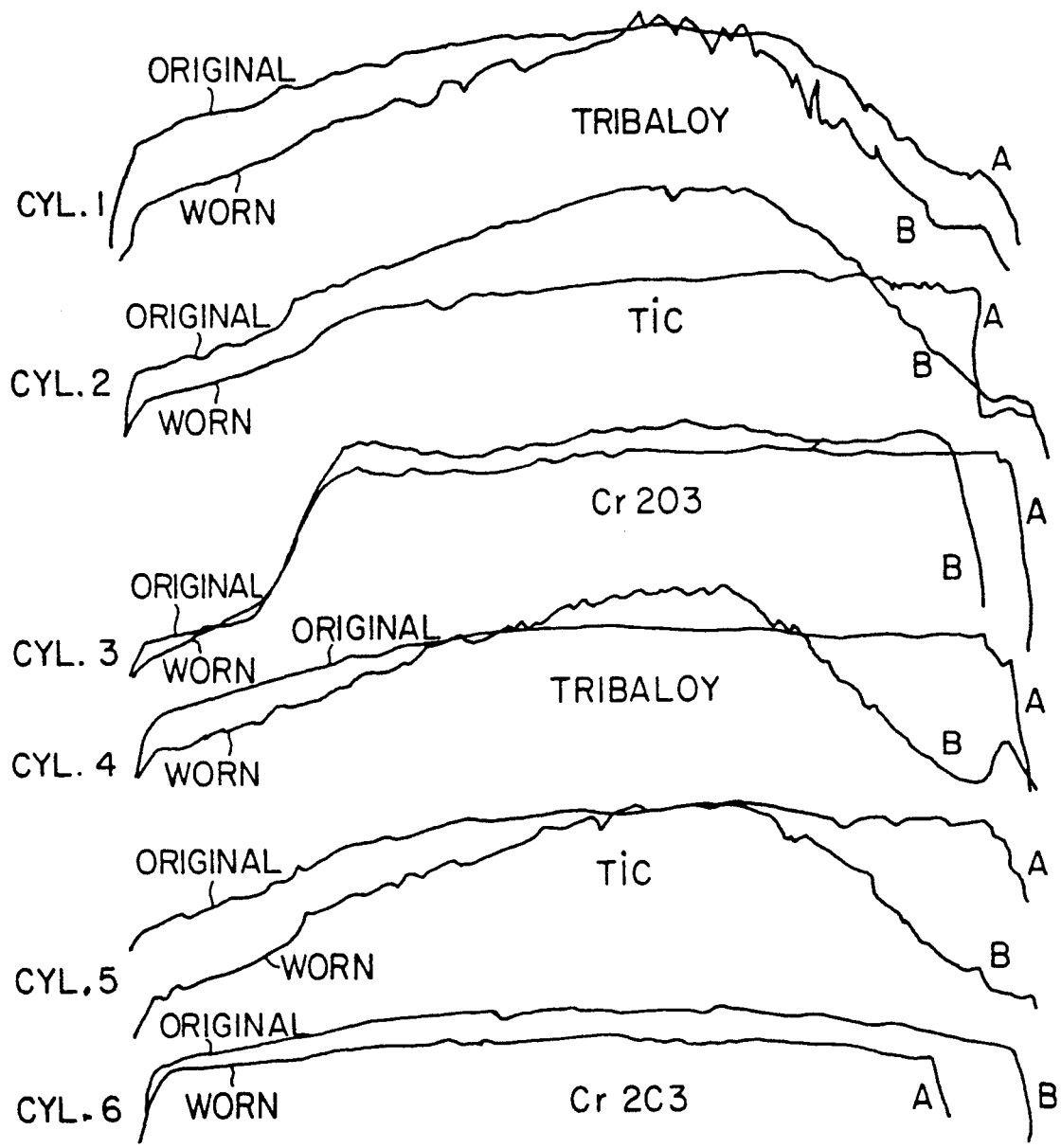
FIG. 20 is a graph detailing a series of curves constituting traces from engine-tested piston rings.
Figure 21:
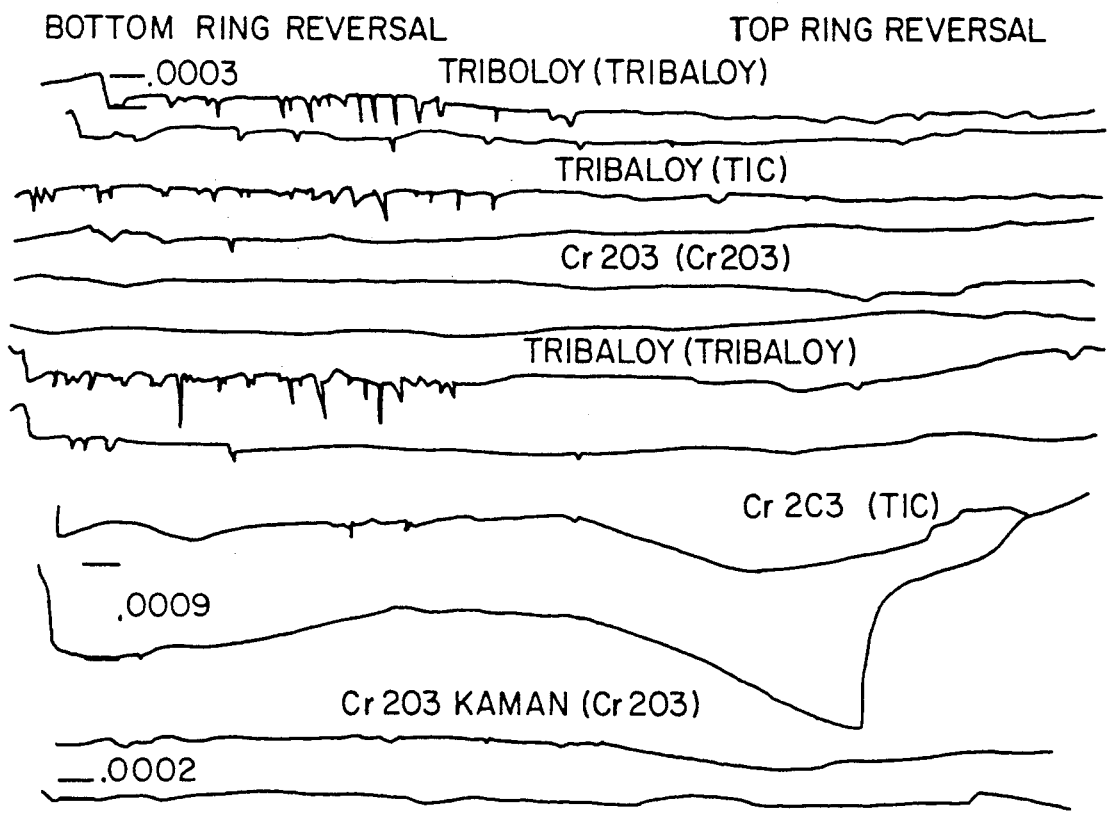
FIG. 21 is a graph detailing a series of curves constituting traces from engine-tested liners.

The simulator unlubricated ring liner wear performance correlated well with results from uncooled NTC-250 engine test. This 6 cylinder heavy duty diesel engine with a displacement of 855 cubic inches was operated for 300 hours without cooling water. Top ring reversal temperatures approximated 427° C. Because of the increased stress placed on the lubricant at the higher operating temperatures, coatings (Table III) were used on the ring and liner surfaces to control wear. Of several combinations tested, the self-mated plasma sprayed chromium oxide coating and the TiC/Cr$_3$C$_2$ ring/liner combinations were found to have the lowest and highest wear rates respectively based on profilometer traces (FIGS. 20 and 21) of the components from the above tests.

As discussed previously, unlubricated simulator wear ring evaluations were performed on the same wear couple combinations using samples of rings and liners used for the 300 hr engine test. Profilometer traces from these test (FIGS. 13 and 17) show the performance of the chromium oxide and TIC/Cr$_3$C$_2$ couples to agree with the engine wear results on a relative basis.

INTERFACE OIL QUANTITY AND QUALITY CONSIDERATIONS

One of the significant features of the simulator is the means by which the friction force is obtained. The simulator employs strain gauged pivots which permit measurement of right and left friction forces simultaneously. Viewing these results, it was apparent that side to side differences initially existed. Unlike an engine, the oil supply at the wear interface of the simulator can be systematically varied in both quantity and quality. Friction differences side to side are virtually eliminated when oil quantity and quality are also equal side to side.

TABLE III

RING AND LINER COATINGS TESTED

| Piston Ring Coatings | Liner Coatings |
| --- | --- |
| A. Best Combinations | |
| —Cr$_2$O$_3$ | —Cr$_2$O$_3$ |
| —Cr$_2$O$_3$ | Kaman SCA (Cr$_2$O$_3$ Based) |
| —Cr$_3$C$_2$ | —Cr$_2$O$_3$ |
| Tribaloy | Tribaloy |
| B. Other Combinations | |
| Tribaloy | —Cr$_2$O$_3$ |
| —TiC | —Cr$_3$C$_2$ |
| —Cr$_3$C$_2$ | Kaman SCA (Cr$_2$O$_3$ Based) |
| —Cr$_2$O$_3$ | —Al$_2$O$_3$ |
| —Al$_2$O$_3$/TiO$_2$ | —SiC |
| —VC | Tribaloy |
| —TiN | —NiCr/Al$_2$O$_3$ |

Figure 22:
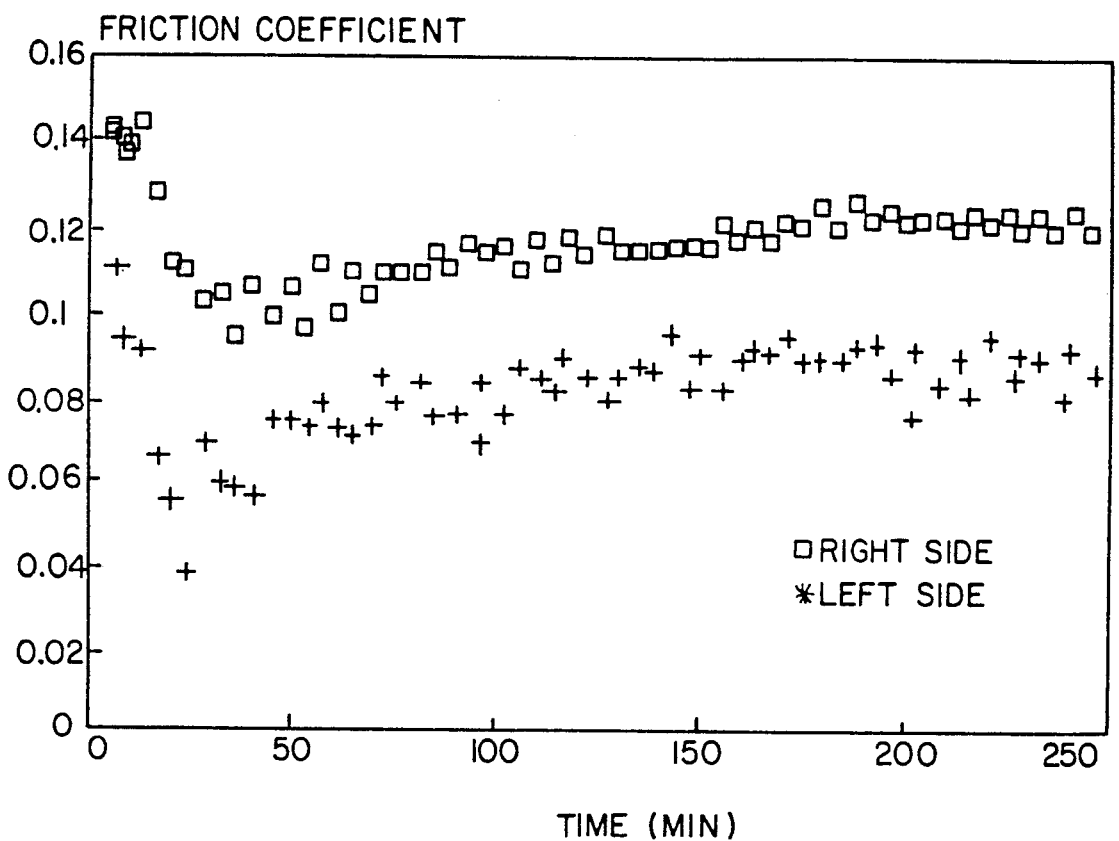
FIG. 22 is a graph detailing right and left side friction coefficients over the length of the test.
Figure 23:
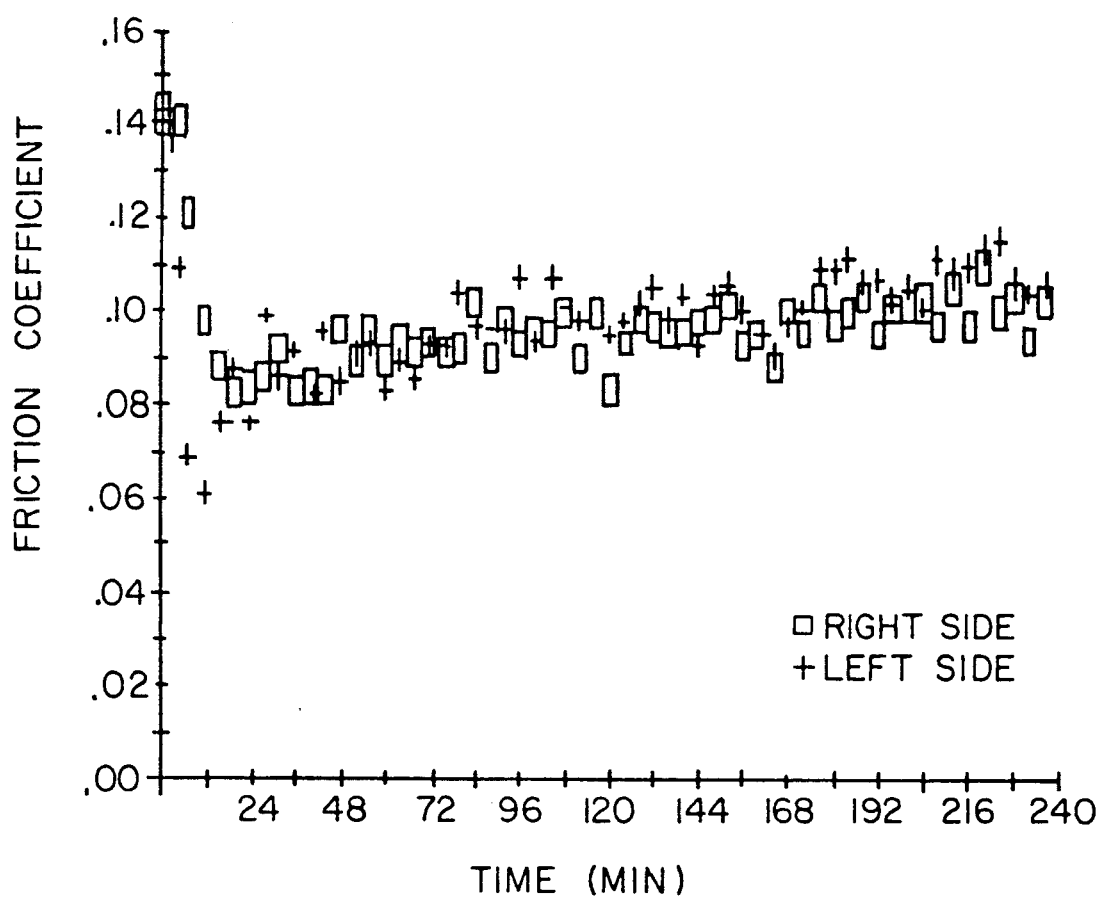
FIG. 23 is a graph detailing right and left side friction coefficients over the length of the test, after partial lubrication balance.

FIGS. 22 and 23 show how average friction coefficient history varied when oil supply quality was more equalized side to side. Test results are for production gray iron liner, chrome plated top ring, and CE/SF 15W40 oil. Between tests oil supply tube targeting was improved, and spray pattern was made more uniform by use of pressurized air added to the oil injection tubes. With even better oil delivery, side to side differences were virtually eliminated (see FIG. 24).

Figure 24:
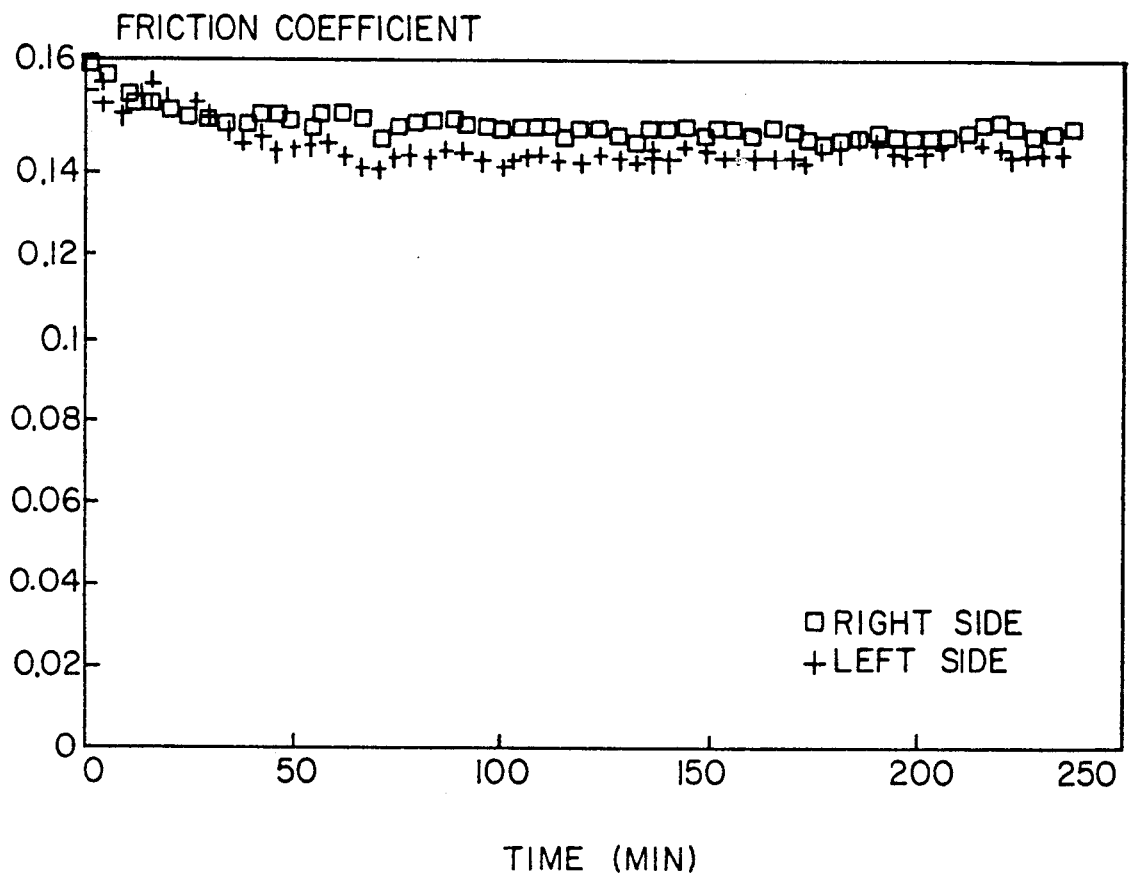
FIG. 24 is a graph detailing right and left side friction coefficients over the length of the test, after full lubrication balance.
Figure 25:
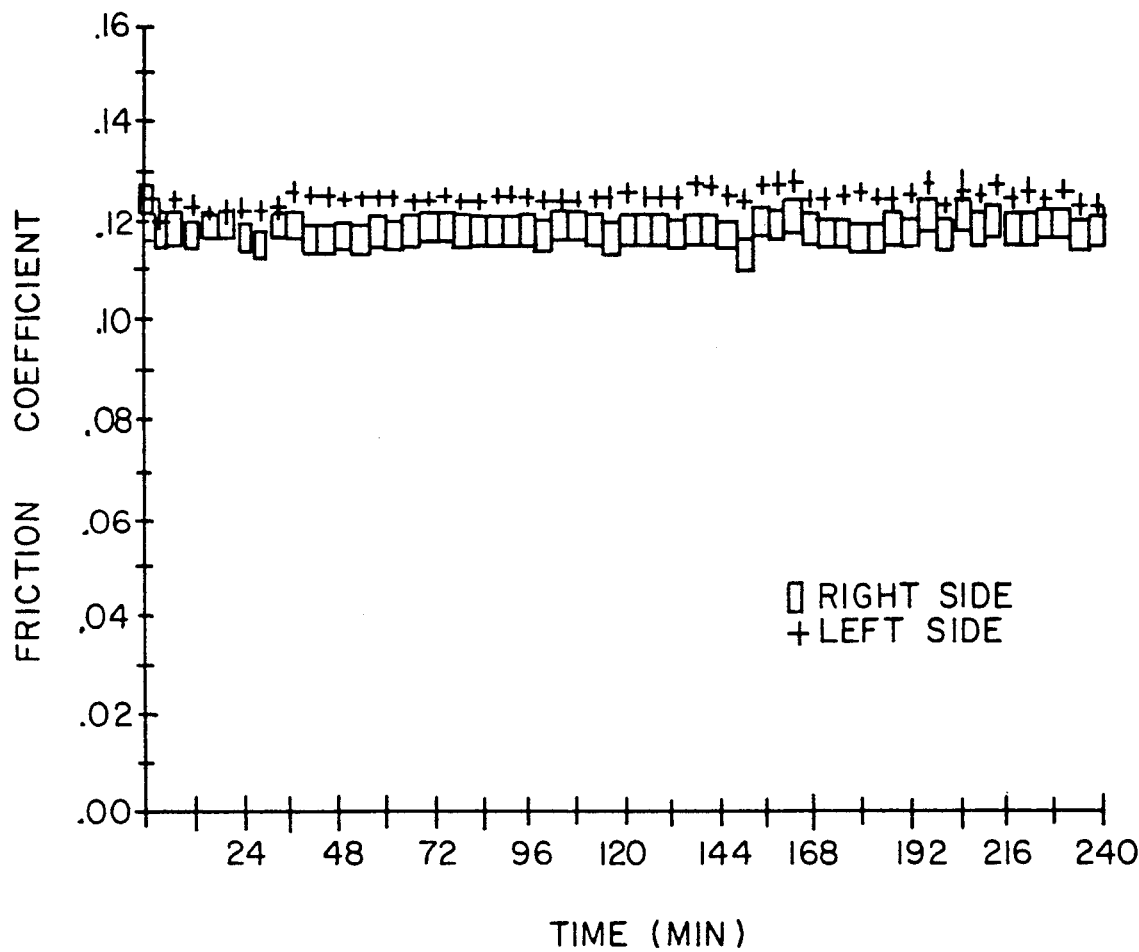
FIG. 25 is a graph detailing right and left side friction coefficients over the length of the test using synthetic lubricant.

Interesting data which demonstrate side to side similarity, as well as lubricant effects, are shown by comparing FIGS. 24 and 25. The use of the synthetic oil not only eliminated the break-in period but also lowered friction coefficient from a stabilized value of 0.14 to about 0.12, when compared to the CE/SF 15W40 commercial oil.

SIMULATOR REPEATABILITY

Table IV gives data showing simulator repeatability at a fixed operating condition with the two different oils discussed above. Both liner weight loss and average friction coefficient for the last half hour of the 4 hour test are shown. While minor variations are evident from sample to sample, it is quite clear that the repeatability was excellent. Furthermore, the synthetic oil gave consistently lower wear and friction coefficients under the test conditions employed.

TABLE IV

SIDE TO SIDE AND REPEATABILITY COMPARISON

TEST CONDITIONS

| | |
|---|---|
| Speed: | 500 rpm |
| Oil Rate: | 2 ml/hr each side |
| Ring: | Chrome plated, 140 mm dia, 3.8 mm width |
| Liner: | Two cast iron samples, 6.9 mm width |
| Stroke: | 25.4 mm |
| Temp: | 149° C. |
| Load: | 180 N normal force (simulates 6.9 MPa pressure behind ring) |
| Time: | 4 hour tests |

RESULTS

CE/SF: Commercial 15W40 mineral oil

| Liner Side | Liner Weight Loss, Grams | Average Friction Coef (last ½ hr) |
|---|---|---|
| L | 0.0034 | 0.14 |
| R | 0.0025 | 0.14 |
| L | 0.0027 | 0.14 |
| R | 0.0022 | 0.14 |
| L | 0.0027 | 0.15 |
| R | 0.0013 | 0.14 |
| L | 0.0033 | 0.14 |
| R | 0.0019 | 0.13 |

Synthetic Oil: Commerical Polyol Ester

| Liner Side | Liner Weight Loss, Grams | Average Friction Coef (last ½ hr) |
|---|---|---|
| L | 0.0010 | 0.12 |
| R | 0.0010 | 0.12 |
| L | 0.0005 | 0.13 |
| R | 0.0004 | 0.11 |
| L | 0.0003 | 0.13 |
| R | 0.0004 | 0.12 |

CONCLUSIONS AND OBSERVATIONS

Based on the test experiences outlined above, the following conclusions and observations are made:
1. In unlubricated tests the titanium carbide, chromium carbide pair was a poor combination, whereas the chromium oxide pair was exceptional. The simulator test correlated directionally with Cameron Plint results, and were in qualitative agreement with engine results.
2. Lubricated tests demonstrated lower wear and friction as expected. Careful control of lubricant feed rate, targeting, and spray pattern were required for good repeatability and minimization of side to side variations. Air atomization of the lubricant was very helpful.
3. Additional tests can establish additional correlation between results from bench tests and running engines. Such work could includes development of standard test procedures, parametric evaluations, and more sophisticated surface analysis of wear samples.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A wear simulator for piston rings and cylinder liners comprises:
   a piston ring holder having means for receiving a piston ring;
   a cylinder liner holder having means for receiving a portion of a cylinder liner;
   positioning means connected to said cylinder liner holder for placing a cylinder liner portion received by said cylinder liner holder in contact with a piston ring received by said piston ring holder;
   reciprocating means connected to said piston ring holder for imparting a reciprocating stroke to a piston ring received by said piston holder; and
   force measuring means cooperatively arranged with said cylinder liner holder for providing a signal corresponding to the level of frictional force between a piston ring received by said piston ring holder and a cylinder liner portion received by said cylinder liner holder.

2. The wear simulator of claim 1 wherein said positioning means includes a pivoting arm attached at one end to said cylinder liner holder.

3. The wear simulator of claim 3 wherein said positioning means further includes an air cylinder having a movable output shaft, said output shaft attached to the opposite end of said pivoting arm.

4. The wear simulator of claim 3 wherein said reciprocating means includes rotary drive means and a linkage connected to said rotary drive means, said linkage connected so as to convert rotary motion into reciprocating motion.

5. The wear simulator of claim 4 wherein said rotary drive means includes a drive motor coupled to a gear.

6. The wear simulator of claim 5 which further includes sensor means for generating analog signals corresponding to piston ring position and drive motor speed.

7. The wear simulator of claim 1 wherein said reciprocating means includes rotary drive means and a linkage connected to said rotary drive means, said linkage connected so as to convert rotary motion into reciprocating motion.

8. The wear simulator of claim 7 wherein said rotary drive means includes a drive motor coupled to a gear.

9. The wear simulator of claim 8 which further includes sensor means for generating analog signals corresponding to piston ring position and drive motor speed.

10. The wear simulator of claim 1 wherein said force measuring means includes a strain gauge mechanically linked to said cylinder liner holder and arranged to be responsive to forces on said cylinder liner holder.

11. The wear simulator of claim 10 wherein said positioning means includes a pivoting arm attached at one end to said cylinder liner holder.

12. The wear simulator of claim 11 wherein said reciprocating means includes rotary drive means and a linkage connected to said rotary drive means, said linkage connected so as to convert rotary motion into reciprocating motion.

13. The wear simulator of claim 12 wherein said rotary drive means includes a drive motor coupled to a gear.

14. The wear simulator of claim 13 which further includes sensor means for generating analog signals corresponding to piston ring position and drive motor speed.

15. A method of deriving piston ring and cylinder liner wear data comprising the following steps:
- mounting a piston ring in a holder;
- mounting a portion of a cylinder liner in a holder;
- positioning said cylinder ring portion in contact with said piston ring;
- connecting force measuring means to said cylinder liner holder;
- moving said piston ring in a reciprocating manner; and
- recording frictional force data generated by the reciprocating action of the piston ring against the cylinder liner portion and sensed by said force measuring means.

16. A wear simulator for contacting mechanical components having a reciprocating relationship in their actual-use environment, said wear simulator comprises:
- a first holder having means for receiving a first mechanical component;
- a second holder having means for receiving a second mechanical component;
- positioning means connected to said second holder for placing said second mechanical component received by said second holder in contact with said first mechanical component received by said first holder;
- reciprocating means connected to said first holder for imparting a reciprocating stroke to said first mechanical component received by said first holder; and
- force measuring means cooperatively arranged with said second holder for providing a signal corresponding to the level of frictional force between said first mechanical component received by said first holder and said second mechanical component received by said second holder.

17. The wear simulator of claim 16 wherein said positioning means includes a pivoting arm attached at one end to said second holder.

18. The wear simulator of claim 16 wherein said reciprocating means includes rotary drive means and a linkage connected to said rotary drive means, said linkage connected so as to convert rotary motion into reciprocating motion.

19. The wear simulator of claim 16 wherein said force measuring means includes a strain gauge mechanically linked to said second holder and arranged to be responsive to forces on said second holder.

20. A method of deriving frictional wear data for two mechanical components which have a reciprocating relationship in their actual-use environment, said method comprising the following steps:
- mounting a first one of the two mechanical components in a first holder;
- mounting a second one of the two mechanical components in a second holder;
- positioning said first one and said second one of said two mechanical components in contact with each other;
- connecting force measuring means to said second holder;
- moving said first one of said two mechanical components in a reciprocating manner; and
- recording fictional force data generated by the reciprocating action of the first one of said two mechanical components against the second one of said two mechanical components and sensed by said force-measuring means.

* * * * *